(12) United States Patent
Yoshioka et al.

(10) Patent No.: US 12,289,171 B2
(45) Date of Patent: Apr. 29, 2025

(54) USER EQUIPMENT AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 578 days.

(21) Appl. No.: 17/608,922

(22) PCT Filed: May 10, 2019

(86) PCT No.: PCT/JP2019/018840
§ 371 (c)(1),
(2) Date: Nov. 4, 2021

(87) PCT Pub. No.: WO2020/230221
PCT Pub. Date: Nov. 19, 2020

(65) Prior Publication Data
US 2022/0216956 A1 Jul. 7, 2022

(51) Int. Cl.
*H04J 3/00* (2006.01)
*H04L 1/1867* (2023.01)
*H04W 72/0446* (2023.01)

(52) U.S. Cl.
CPC ....... *H04L 1/1893* (2013.01); *H04W 72/0446* (2013.01)

(58) Field of Classification Search
CPC ..... H04L 1/1893; H04L 1/1887; H04L 1/189; H04W 72/0446; H04W 72/20; H04W 74/0808; H04W 72/02; H04W 92/18

USPC ......................................................... 370/336
See application file for complete search history.

(56) References Cited

U.S. PATENT DOCUMENTS

| | | | | |
|---|---|---|---|---|
| 9,191,175 | B2* | 11/2015 | Kim ................. | H04W 52/0238 |
| 9,838,899 | B2* | 12/2017 | Park .................... | H04L 5/0057 |
| 10,051,566 | B2* | 8/2018 | Yang ................ | H04W 52/0209 |
| 10,057,920 | B2* | 8/2018 | Yu ..................... | H04W 74/0833 |
| 10,172,101 | B2* | 1/2019 | Kazmi ............... | H04W 52/346 |
| 10,178,529 | B2* | 1/2019 | Choi .................... | H04W 72/56 |
| 10,455,587 | B2* | 10/2019 | Seo ....................... | H04W 72/56 |
| 10,551,480 | B2* | 2/2020 | Modarres Razavi ....................... G01S 5/0036 |

(Continued)

FOREIGN PATENT DOCUMENTS

| | | |
|---|---|---|
| EP | 3468268 A1 | 4/2019 |
| EP | 3499921 A1 | 6/2019 |

(Continued)

OTHER PUBLICATIONS

International Search Report issued in PCT/JP2019/018840 on Dec. 10, 2019 (4 pages).

(Continued)

*Primary Examiner* — Amancio Gonzalez
(74) *Attorney, Agent, or Firm* — Osha Bergman Watanabe & Burton LLP

(57) ABSTRACT

User equipment includes a control unit that selects a sidelink resource from candidate resources excluding a selected resource and a further resource within a predetermined time window and a transmitting unit that performs transmission or retransmission using the resource selected by the control unit.

3 Claims, 16 Drawing Sheets

(56) References Cited

U.S. PATENT DOCUMENTS

| | | | | |
|---|---|---|---|---|
| 10,674,515 | B2* | 6/2020 | Zhang | H04W 72/51 |
| 10,687,376 | B2* | 6/2020 | Pan | H04W 76/15 |
| 10,841,935 | B2* | 11/2020 | Takeda | H04L 1/1887 |
| 10,992,424 | B2* | 4/2021 | Lee | H04L 5/0053 |
| 11,026,120 | B2* | 6/2021 | Khoryaev | H04L 5/0042 |
| 11,140,697 | B2* | 10/2021 | Hu | H04B 7/0456 |
| 11,172,506 | B2* | 11/2021 | Lee | H04B 17/318 |
| 11,229,054 | B2* | 1/2022 | Ku | H04W 74/0825 |
| 11,234,248 | B2* | 1/2022 | Hu | H04W 72/542 |
| 11,239,941 | B2* | 2/2022 | Nguyen | H04L 1/0038 |
| 11,252,675 | B2* | 2/2022 | Hong | H04W 52/34 |
| 11,375,558 | B2* | 6/2022 | Parron | H04W 76/12 |
| 11,382,083 | B2* | 7/2022 | Guo | H04W 88/023 |
| 11,382,140 | B2* | 7/2022 | Ye | H04W 74/0833 |
| 11,412,467 | B2* | 8/2022 | Kim | H04L 27/2607 |
| 11,589,321 | B2* | 2/2023 | Roth-Mandutz | H04L 27/2607 |
| 11,664,933 | B2* | 5/2023 | Lee | H04L 69/324 |
| | | | | 370/329 |
| 11,695,531 | B2* | 7/2023 | Khoryaev | H04L 5/0055 |
| | | | | 370/330 |
| 11,723,046 | B2* | 8/2023 | Li | H04L 5/0094 |
| | | | | 370/329 |
| 11,750,257 | B2* | 9/2023 | Song | H04W 72/21 |
| | | | | 370/252 |
| 11,765,689 | B2* | 9/2023 | Seo | H04W 4/40 |
| | | | | 370/329 |
| 11,765,693 | B2* | 9/2023 | He | H04L 1/1861 |
| | | | | 370/329 |
| 11,848,878 | B2* | 12/2023 | Tsai | H04W 72/23 |
| 11,864,160 | B2* | 1/2024 | Lee | H04W 74/0816 |
| 11,895,651 | B2* | 2/2024 | Chae | H04W 72/20 |
| 11,917,507 | B2* | 2/2024 | Zhao | H04W 72/20 |
| 2019/0182806 | A1 | 6/2019 | Chae | |
| 2020/0296796 | A1 | 9/2020 | Uchiyama et al. | |
| 2020/0342869 | A1* | 10/2020 | Lee | G10L 15/22 |
| 2021/0058914 | A1* | 2/2021 | Chae | H04B 7/0695 |
| 2021/0120616 | A1* | 4/2021 | Breuer | H04L 1/1829 |
| 2021/0250881 | A1* | 8/2021 | Lee | H04W 56/001 |
| 2021/0289473 | A1* | 9/2021 | Chae | H04W 72/12 |
| 2021/0306824 | A1* | 9/2021 | Li | H04W 4/40 |
| 2021/0360549 | A1* | 11/2021 | Lee | H04W 56/006 |
| 2021/0400509 | A1* | 12/2021 | Lee | B60W 40/08 |
| 2021/0400634 | A1* | 12/2021 | Lee | H04W 72/1263 |
| 2022/0046593 | A1* | 2/2022 | Stanczak | H04W 72/02 |
| 2022/0085939 | A1* | 3/2022 | Mondal | H04W 72/21 |
| 2022/0095250 | A1* | 3/2022 | Lee | H04W 4/029 |
| 2022/0150730 | A1* | 5/2022 | Freda | H04W 24/04 |
| 2023/0187970 | A1* | 6/2023 | Gurin | H02J 50/005 |
| | | | | 700/291 |

FOREIGN PATENT DOCUMENTS

| | | |
|---|---|---|
| EP | 3703393 A1 | 9/2020 |
| WO | 2018030541 A1 | 2/2018 |
| WO | 2018030788 A1 | 2/2018 |
| WO | 2019/064465 A1 | 4/2019 |
| WO | 2019/064983 A1 | 4/2019 |
| WO | 2019084927 A1 | 5/2019 |

OTHER PUBLICATIONS

Written Opinion of the International Searching Authority issued in PCT/JP2019/018840 on Dec. 10, 2019 (4 pages).

CATT; "Discussion on in-device coexistence of LTE and NR sidelink in NR"; 3GPP TSG RAN WG1 Meeting #96bis, R1-1905355; Xi'an, China; Apr. 8-12, 2019 (4 pages).

3GPP TS 36.213 V15.5.0; "3rd Generation Partnership Project; Technical Specification Group Radio Access Network; Evolved Universal Terrestrial Radio Access (E-UTRA); Physical layer procedures (Release 15)"; Mar. 2019 (552 pages).

3GPP TSG RAN WG1 Meeting #97; R1-1906796 "Sidelink Resource Allocation Mode-2 Design for NR V2X Communication" Intel Corporation; Reno, USA; May 13-17, 2019 (18 pages).

3GPP TSG RAN WG1 #96bis; R1-1905423 "NR Sidelink Resource Allocation Mechanism Mode 2" NTT DOCOMO, Inc.; Xi'an, China; Apr. 8-12, 2019 (5 pages).

Extended European Search Report issued in European Application No. 19928415.9, dated Oct. 19, 2022 (13 pages).

* cited by examiner

USER EQUIPMENT AND COMMUNICATION METHOD

TECHNICAL FIELD

The present invention relates to a user equipment in a radio communication system.

BACKGROUND ART

In Long Term Evolution (LTE) and a successor system to LTE (for example, LTE Advanced (LTE-A), New Radio (NR) (also referred to as 5G)), Device to Device (D2D) technology for performing direct communication between user equipments without passing through a base station apparatus has been studied.

D2D reduces traffic between a user equipment and a base station apparatus, and enables communication between user equipments even when the base station apparatus cannot communicate therewith during a disaster or the like. In addition, in 3rd Generation Partnership Project (3GPP), D2D is referred to as "sidelink".

D2D communication is classified roughly into D2D discovery for discovering another communicable user equipment and D2D communication (also referred to as D2D direct communication, terminal-to-terminal direct communication, and the like) for direct communication between pieces of user equipments. In addition, various use cases of services relevant to Vehicle to Everything (V2X) in the NR have been studied.

CITATION LIST

Non-Patent Document

Non-Patent Document 1: 3GPP TS 36.213 V15.5.0 (2019-03)

SUMMARY OF THE INVENTION

Problem to be Solved by the Invention

In the sidelink, there is a mode in which a user equipment autonomously selects a transmission resource. In this mode, the user equipment performs sensing to select a resource that is not occupied by other user equipments.

In the NR, it is assumed that HARQ-ACK feedback on the sidelink is introduced. However, in the related art, no specific resource selection method considering retransmission based on the HARQ-ACK feedback has been proposed.

The invention has been made in view of the aforementioned points, and it is an object of the invention to provide a technique that enables a user equipment to perform resource selection in consideration of retransmission in a sidelink.

Means for Solving Problem

According to the disclosed technique, there is provided a user equipment including: a control unit that selects a sidelink resource from candidate resources excluding a selected resource and a further resource within a predetermined time window; and a transmitting unit that performs transmission or retransmission using the resource selected by the control unit.

Effect of the Invention

According to the disclosed technique, a technique that enables a user equipment to perform resource selection in consideration of retransmission.

MODE(S) FOR CARRYING OUT THE INVENTION

Hereinafter, an embodiment of the invention will be described with reference to the diagrams. In addition, the embodiment described below is an example, and the embodiment to which the invention is applied is not limited to the following embodiment. For example, although it is described below that the technique of the invention may be applied to V2X, the invention can be applied to sidelink not limited to V2X.

In the actual operation of a radio communication system according to the embodiment of the invention, known technology may be appropriately used. The known technology is, for example, known LTE or NR, but is not limited to the known LTE or NR.

In addition, in the embodiment of the invention, a duplex system may be a Time Division Duplex (TDD) system, a Frequency Division Duplex (FDD) system, or any other system (for example, Flexible Duplex).

Figure 1:
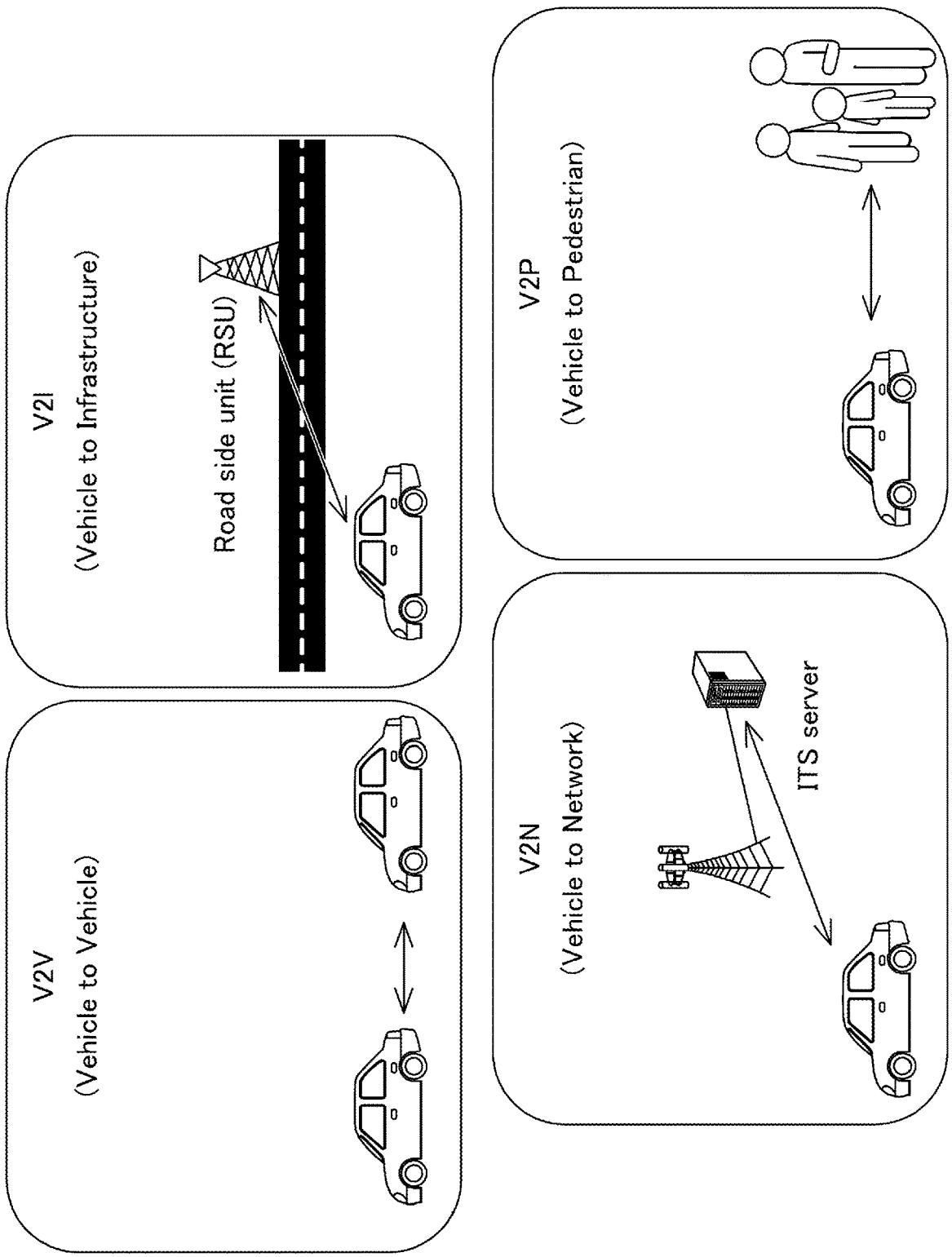
FIG. 1 is a diagram for describing V2X.

FIG. 1 is a diagram for describing V2X. In 3GPP, realizing Vehicle to Everything (V2X) or enhanced V2X (eV2X) by expanding the D2D function has been studied, and the specification is underway. As illustrated in FIG. 1, V2X is a part of Intelligent Transport Systems (ITS), and is a general term for Vehicle to Vehicle (V2V) that means a form of communication performed between vehicles, Vehicle to Infrastructure (V2I) that means a form of communication performed between a vehicle and a road-side unit (RSU) installed on the side of the road, Vehicle to Network (V2N) that means a form of communication performed between a vehicle and an ITS server, and Vehicle to Pedestrian (V2P) that means a form of communication performed between a vehicle and a mobile terminal carried by a pedestrian.

In addition, in 3GPP, V2X using cellular communication and terminal-to-terminal communication in LTE or NR has been studied. V2X using cellular communication is also referred to as cellular V2X. In V2X of NR, studies for realizing large capacity, low delay, high reliability, and Quality of Service (QoS) control are under way.

It is assumed that studies on V2X of LTE or NR, which are not limited to the 3GPP specifications, will be made in the future. For example, it is assumed that ensuring interoperability, reducing costs by implementing higher layers, how to use or switch multiple Radio Access Technologies (RATs), supporting regulations in each country, data acquisition and distribution of V2X platform of LTE or NR, and database management and usage methods will be studied.

In the embodiment of the invention, a form in which a communication device, such as a user equipment (UE), is mounted on a vehicle is mainly assumed, but the embodiment of the invention is not limited to this form. For example, the communication device may be a terminal held by a person, or the communication device may be a device mounted on a drone or an aircraft.

In addition, Sidelink (SL) may be distinguished from Uplink (UL) or Downlink (DL) based on any one or combination of the following 1) to 4). In addition, SL may be another name.
1) Resource allocation in time domain.
2) Resource allocation in frequency domain.
3) Synchronization signal to be referred to (including Sidelink Synchronization Signal (SLSS)).
4) Reference signal used for path loss measurement for transmission power control.

In addition, for Orthogonal Frequency Division Multiplexing (OFDM) of SL or UL, any of Cyclic-Prefix OFDM (CP-OFDM), Discrete Fourier Transform-Spread-OFDM (DFT-S-OFDM), OFDM that is not subjected to Transform precoding, and OFDM that is subjected to Transform precoding may be applied.

Figure 2:
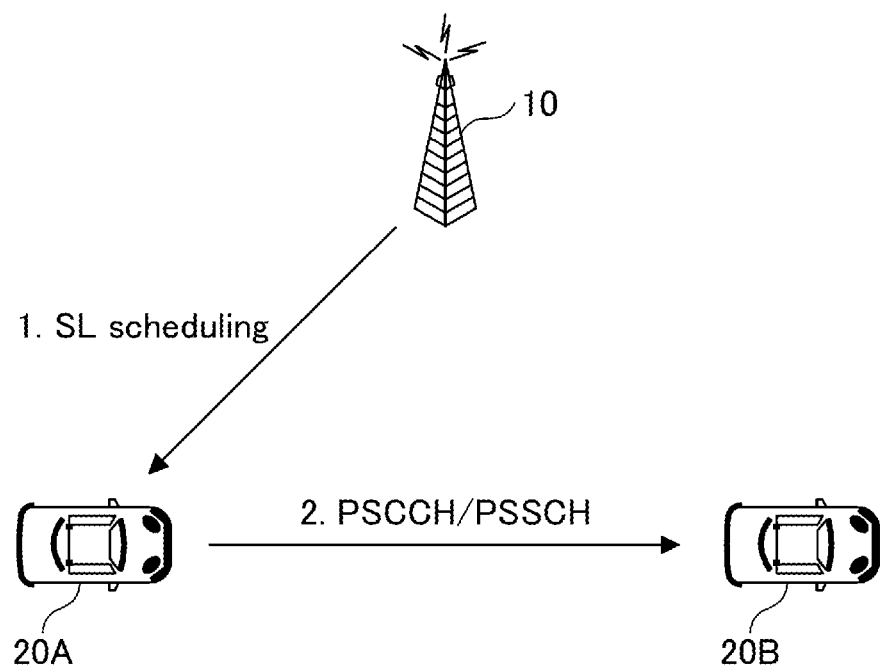
FIG. 2 is a diagram for describing an example (1) of a V2X transmission mode.

The radio communication system according to the present embodiment includes a plurality of user equipments 20 and a base station apparatus 10, as illustrated in FIG. 2 and the like. In addition, the base station apparatus 10 may not be provided. For the user equipment 20, a plurality of user equipments 20 that perform sidelink communication therebetween are described as a user equipment 20A, a user equipment 20B, and the like.

In the radio communication system according to the present embodiment, the physical resource of a radio signal is defined in a time domain and a frequency domain, and the time domain may be defined by the number of OFDM symbols, and the frequency domain may be defined by the number of subcarriers or the number of resource blocks. In addition, a Transmission Time Interval (TTI) in the time domain may be a slot, or the TTI may be a subframe.

The base station apparatus 10 is a communication device that provides one or more cells and performs radio communication with the user equipment 20. The base station apparatus 10 transmits a synchronization signal and system information to the user equipment 20. The synchronization signal is, for example, PSS and SSS. The system information is transmitted through, for example, a PBCH or a PDSCH, and is also referred to as broadcast information. The base station apparatus 10 transmits a control signal or data to the user equipment 20 by Downlink (DL), and receives a control signal or data from the user equipment 20 by Uplink (UL). In addition, here, a signal transmitted through a control channel, such as a PUCCH or a PDCCH, is called a control signal, and a signal transmitted through a shared channel, such as a PUSCH or a PDSCH, is called data. However, such naming is an example. For example, the control signal and the data may be collectively called a "signal".

The user equipment 20 is a communication device having a radio communication function, such as a smartphone, a mobile phone, a tablet, a wearable terminal, and a communication module for Machine-to-Machine (M2M). In addition, for example, as described above, the user equipment 20 is a communication device mounted on a vehicle.

The user equipment 20 uses various communication services provided by the radio communication system by receiving a control signal or data from the base station apparatus 10 by DL and transmitting a control signal or data to the base station apparatus 10 by UL. In addition, the user equipment 20 may be called a UE, and the base station apparatus 10 may be called a gNB (or an eNB).

Regarding the sidelink, sidelink transmission resources can be dynamically allocated by Downlink Control Information (DCI) transmitted from the base station apparatus 10 to the user equipment 20. In addition, Semi Persistent Scheduling (SPS) is also possible. In addition to dynamically receiving the allocation of sidelink transmission resources from the base station apparatus 10, the user equipment 20 can autonomously select a sidelink transmission resource from a resource pool that is a selectable resource configured by the base station apparatus 10.

In addition, a slot in the embodiment of the invention may be read as a symbol, a mini-slot, a subslot, a subframe, a radio frame, and a Transmission Time Interval (TTI). In addition, a cell in the embodiment of the invention may be read as a cell group, a carrier component, a BWP, a resource pool, a resource, a Radio Access Technology (RAT), a system (including a wireless LAN), and the like.

FIG. 2 is a diagram for describing an example (1) of a V2X transmission mode. In the transmission mode of the sidelink communication illustrated in FIG. 2, in step 1, the base station apparatus 10 transmits scheduling information of the sidelink to the user equipment 20A. Then, the user equipment 20A transmits a Physical Sidelink Control Channel (PSCCH) and a Physical Sidelink Shared Channel (PSSCH) to the user equipment 20B based on the received scheduling information (step 2). The transmission mode of the sidelink communication illustrated in FIG. 2 may be called sidelink transmission mode 3 in LTE. In sidelink transmission mode 3 in LTE, Uu-based sidelink scheduling is performed. Uu is a radio interface between Universal Terrestrial Radio Access Network (UTRAN) and User Equipment (UE). The transmission mode of the sidelink communication illustrated in FIG. 2 may be called sidelink transmission mode 1 in the NR. In this case, the above-described Uu becomes NR-Uu, which is a radio interface between the NR and the UE.

Figure 3:
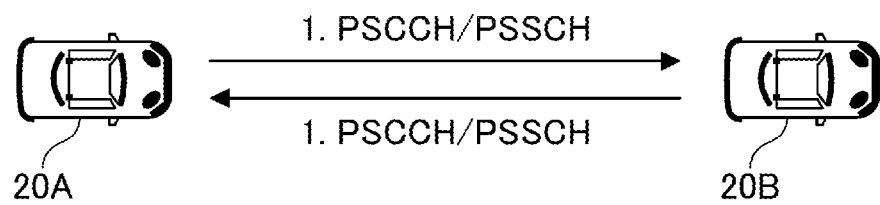
FIG. 3 is a diagram for describing an example (2) of a V2X transmission mode.

FIG. 3 is a diagram for describing an example (2) of the V2X transmission mode. In the transmission mode of the sidelink communication illustrated in FIG. 3, in step 1, the user equipment 20A transmits the PSCCH and the PSSCH to the user equipment 20B using the autonomously selected resource. Similarly, the user equipment 20B transmits the PSCCH and the PSSCH to the user equipment 20A using the autonomously selected resource (step 1). The transmission mode of the sidelink communication illustrated in FIG. 3 may be called sidelink transmission mode 2a in the NR. In the sidelink transmission mode 2a in the NR, the UE itself performs resource selection. In addition, the mode illustrated in FIG. 3 may be called resource allocation mode 2.

In the resource allocation mode 2, the user equipment 20 on the transmission side performs sensing to select a free resource. The sensing procedure may be executed by decoding Sidelink Control Information (SCI) transmitted from another user equipment 20, or may be executed based on received power by sidelink measurement. Sidelink Feedback Control Information (SFCI) transmitted through a Physical Sidelink Feedback Channel (PSFCH) may be used in the sensing procedure. A resource selection procedure for determining resources used for sidelink transmission is executed based on a result of the sensing procedure.

In addition, the granularity of resources applied to the sensing procedure and the resource selection procedure may be defined in PRB units, slot units, subslot units, mini-slot units, and other resource pattern units. By decoding the SCI applied to the sensing procedure, at least information regarding the sidelink resource notified by the user equipment 20 that transmits the SCI is acquired. In addition, details of the resource selection method according to the present embodiment will be described later.

Figure 4:
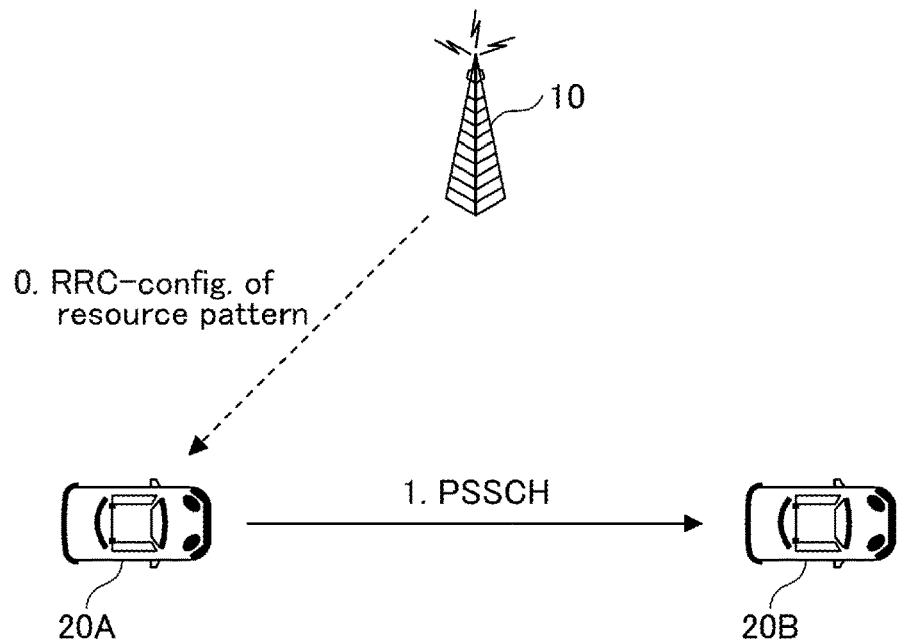
FIG. 4 is a diagram for describing an example (3) of a V2X transmission mode.

FIG. 4 is a diagram for describing an example (3) of the V2X transmission mode. In the transmission mode of the sidelink communication illustrated in FIG. 4, in step 0, the base station apparatus 10 transmits a pattern of usable resources of the sidelink to the user equipment 20A through Radio Resource Control (RRC) configuration. Alternatively, this is configured (in advance) in the user equipment 20A. Subsequently, the user equipment 20A transmits the PSSCH to the user equipment 20B based on the available resource pattern (step 1). The transmission mode of the sidelink communication illustrated in FIG. 4 may be called sidelink transmission mode 2c in the NR.

Figure 5:
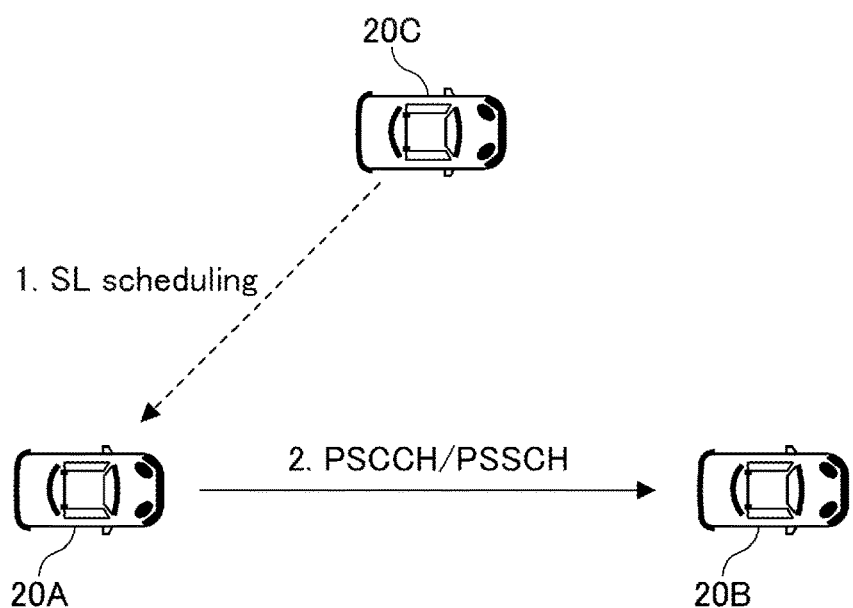
FIG. 5 is a diagram for describing an example (4) of a V2X transmission mode.

FIG. 5 is a diagram for describing an example (4) of the V2X transmission mode. In the transmission mode of the sidelink communication illustrated in FIG. 5, in step 1, a user equipment 20C transmits scheduling information of the sidelink to the user equipment 20A through the PSCCH. Subsequently, the user equipment 20A transmits the PSCCH and the PSSCH to the user equipment 20B based on the received scheduling information (step 2). The transmission mode of the sidelink communication illustrated in FIG. 5 may be called sidelink transmission mode 2d in the NR. Note that "transmitting the PSCCH" may be rephrased as transmitting control information using the PSCCH. In addition, "transmitting the PSSCH" may be rephrased as transmitting data using the PSSCH.

In addition, it is assumed that the techniques of Examples 1 and 2 described below are applied to the resource allocation mode 2 described above, but the invention is not limited to this. The operations of Examples 1 and 2 may be executed in all the above modes.

Figure 6:
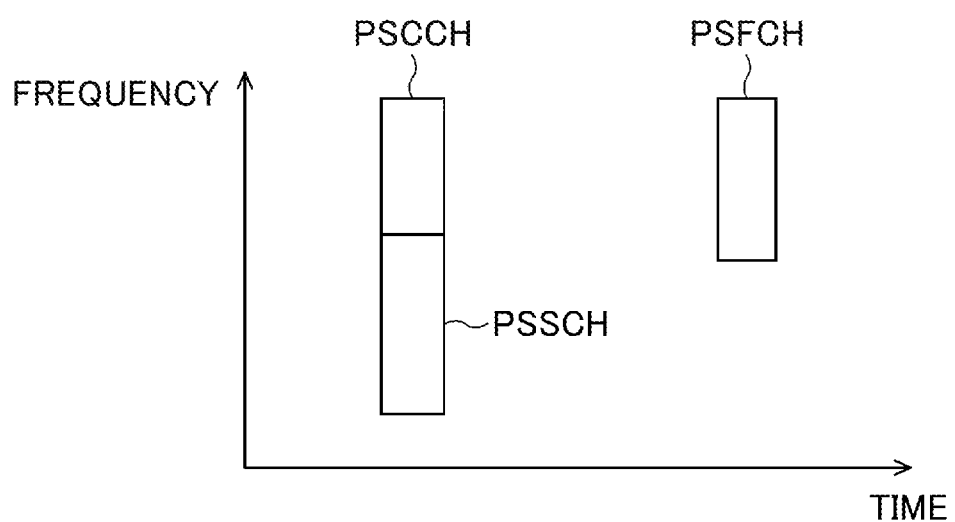
FIG. 6 is a diagram illustrating an example of a channel configuration.

FIG. 6 is an example of the channel configuration of a sidelink. In this example, the PSCCH and the PSSCH are arranged adjacent to each other in the frequency domain, and the transmission of the SCI through the PSCCH and the transmission of the data through the PSSCH are performed simultaneously (for example, in one slot or one subframe). In addition, the PSFCH is disposed after the PSCCH/PSSCH ("after" in the time domain).

Hereinafter, the content of processing relevant to resource selection in a mode in which the user equipment 20 autonomously selects a resource (such as the resource allocation mode 2 described above) and data transmission using the selected resource will be described in detail.

Regarding Resource Selection

An outline of resource selection will be described. Note that, operations such as sensing and exclusion of reserved resources herein are based on the LTE technology described in Non-Patent Document 1 and the like. Also in the NR, a technology based on the LTE technology may be used for sensing and exclusion of reserved resources, or a technology different from the LTE technology may be used.

The user equipment 20 performs sensing in the background. In the sensing, the user equipment UE reads control information (including resource reservation information and the like) and measures an interference pattern by power detection. Then, when transmission data occurs, the user equipment UE selects a resource, among a plurality of resources (candidate resources) having low interference within the resource selection window (that is, not reserved or used by another user equipment), based on the result of sensing from the past predetermined time (for example, 1000 ms) to the present time, and transmits data using the resource. Additionally or alternatively, in the sensing, the user equipment UE reads control information (including resource reservation information and the like) and measures interference by power detection. Then, when transmission data occurs, the user equipment UE selects a resource, among a plurality of resources (candidate resources) having low interference within the resource selection window, based on a sensing result relevant to control information for reserving resources within the resource selection window, and transmits data using the resource.

Note that, "data" in this specification may be rephrased as a TB (transport block), a packet, and the like.

It is assumed that data transmission on the sidelink in the embodiment of the invention is performed periodically or aperiodically. In the periodic transmission, if the user equipment 20 continues to use the same resource in each transmission period, data to be transmitted may continue to collide with data transmitted from another user equipment 20. Therefore, a reselection counter for reselecting a resource may be used. When the reselection counter is used, the reselection counter is decremented each time transmission is performed from the time of transmission in the first period, and the user equipment 20 performs resource reselection when the reselection counter becomes 0.

In the description of this specification, it is assumed that the meaning of "resource selection" includes the resource reselection described above as well as resource selection when transmission data is newly generated. In addition, resources that can be selected within the resource selection window (resources that have not been excluded) are referred to as "candidate resources".

Figure 7:
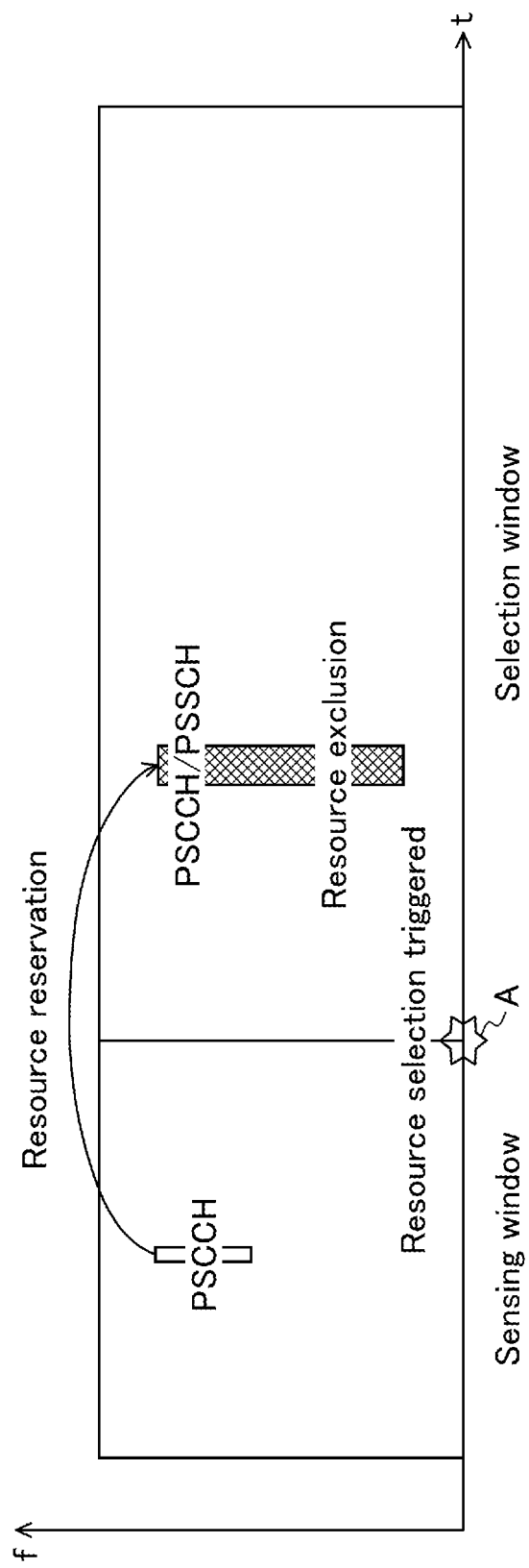
FIG. 7 is a diagram for describing resource selection.

The outline of the resource selection operation in the user equipment 20 is as follows. As illustrated in FIG. 7, the user equipment 20 may grasp a reserved resource (transmission resource of another user equipment) by decoding control information of another user equipment 20 received in the sensing window, and exclude the resource from the candidate resources. In the example of FIG. 7, it is illustrated that PSCCH/PSSCH resources of another user equipment are excluded. In addition, "PSCCH/PSSCH" means only PSCCH, only PSSCH, or PSCCH and PSSCH.

After the resource exclusion, the user equipment 20 performs processing, such as ranking and candidate resource selection, to obtain a set of candidate resources that can be selected for transmission. The user equipment 20 selects a resource from the set of candidate resources obtained as described above, and performs transmission using the selected resource.

As described above, in the sidelink of the NR, HARQ-ACK based retransmission is supported. That is, for transmission and reception of a certain PSSCH, when NACK is transmitted by HARQ-ACK feedback, the PSSCH can be retransmitted. In the present embodiment, in resource selection for data transmission, the user equipment 20 selects up to N resources from candidate resources within the resource selection window in consideration of HARQ-ACK based retransmission. Here, N is an integer of 0 or more. N may include a resource for performing HARQ-ACK based retransmission, may include a resource for performing retransmission not based on HARQ-ACK (for example, may be referred to as Blind Retransmission, Repetition, and the like), or may include both of the above.

The user equipment 20 may determine the maximum number of retransmissions (the number of times including the initial transmission) based on, for example, a Channel busy ratio (CBR). In addition, N may be the maximum number of retransmissions, may be a value determined regardless of the maximum number of retransmissions, may be a value set from base station apparatus 10, or may be a value determined in advance by specifications or the like. The maximum number of retransmissions may be a value for retransmission based on HARQ-ACK, a value for retransmission not based on HARQ-ACK, or a value for both of the above.

When HARQ-ACK based retransmission is supported and the user equipment 20 selects a plurality of resources, it is necessary to select resources appropriately in order to secure a sufficient number of retransmissions.

Figure 8:
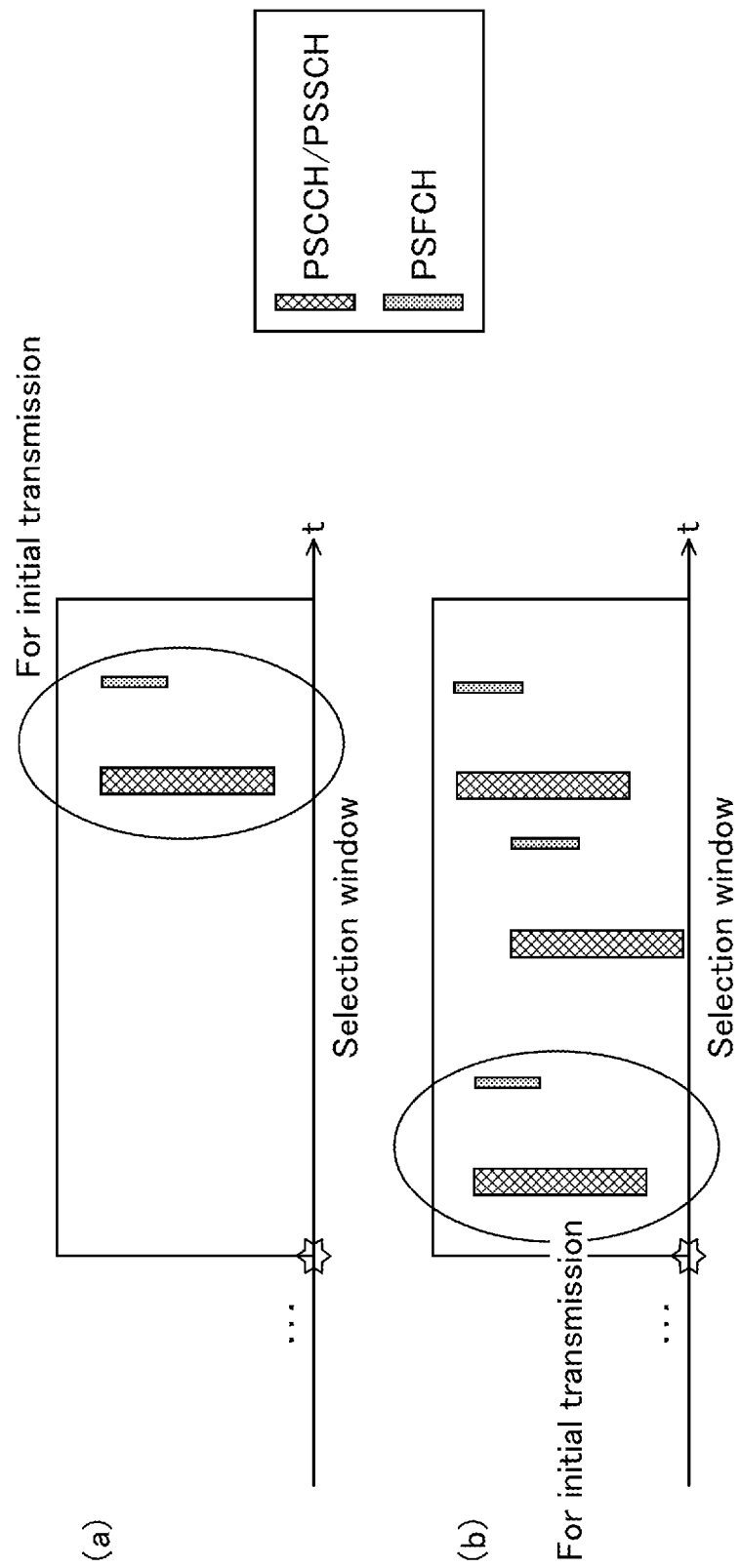
FIG. 8 is a diagram illustrating an example of a selected resource.

FIG. 8(a) illustrates an example in which inappropriate resource selection is made when retransmission is considered. The vertical axis in FIG. 8(a) is a frequency. The same applies to the following diagrams. In the example of FIG. 8(a), the PSCCH/PSSCH resource and the PSFCH resource are selected near the end of the resource selection window. In this case, initial transmission (first transmission) and HARQ-ACK feedback are performed using the selected resources. However, since a resource after the PSFCH resource is not selected, retransmission cannot be performed.

FIG. 8(b) illustrates an example in which appropriate resource selection is made. Also in the example of FIG. 8(b), by using the earliest resource for the initial transmission, the next resource can be used for retransmission. If necessary, further next resources can be used for retransmission.

Hereinafter, the specific processing content of resource selection will be described as Example 1, and the specific processing content of transmission using selected resources will be described as Example 2. Example 2 is based on the resource selection in Example 1. However, Example 2 may be executed regardless of the resource selection in Example 1.

EXAMPLE 1

Figure 9:
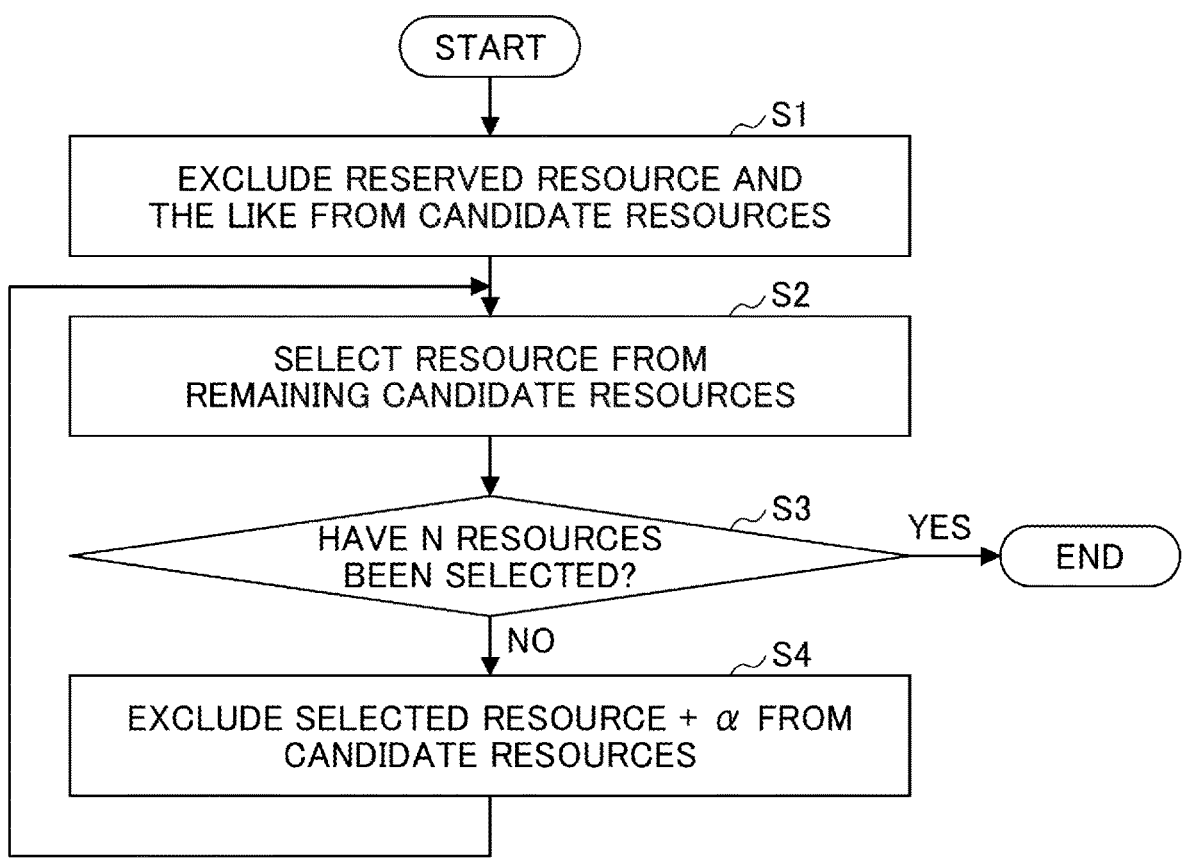
FIG. 9 is a diagram illustrating an example of a resource selection procedure.

FIG. 9 is an example of a resource selection operation performed by the user equipment 20 when resource selection trigger (for example, new transmission data occurs, resource reselection trigger occurs) occurs in the user equipment 20. In addition, the user equipment 20 constantly performs sensing.

In step 1, the user equipment 20 excludes, resources and the like, which are obtained by sensing and reserved by other user equipments 20, from candidate resources within the resource selection window.

In step 2, the user equipment 20 selects one resource from the remaining candidate resources. When N resources have been selected (Yes in step 3), the resource selection process ends, and, for example, a set of selected resources is reported to the higher layer.

When N resources are not selected, in step 4, the user equipment 20 excludes the selected resource +α from the candidate resources, and returns to the processing of step 2 to repeat the processing from step 2.

In addition, the processing content described in FIG. 9 is merely an example. For example, instead of selecting resources one by one, a plurality of resources may be selected collectively. In addition, the resource selection processing may end even when N pieces are not selected. In addition, S1 and S4 may be separately executed instead of a series of processes.

Hereinafter, an operation example relevant to each step will be described more specifically.

Operation Example 1 (Relevant to Step 2)

When the user equipment 20 selects an initial resource from candidate resources that remain without being excluded, the user equipment 20 randomly selects one resource from all the candidate resources remaining without being excluded. The operation of randomly selecting one resource from all the candidate resources remaining without being excluded may be applied to the second and subsequent resource selections.

Figure 10:
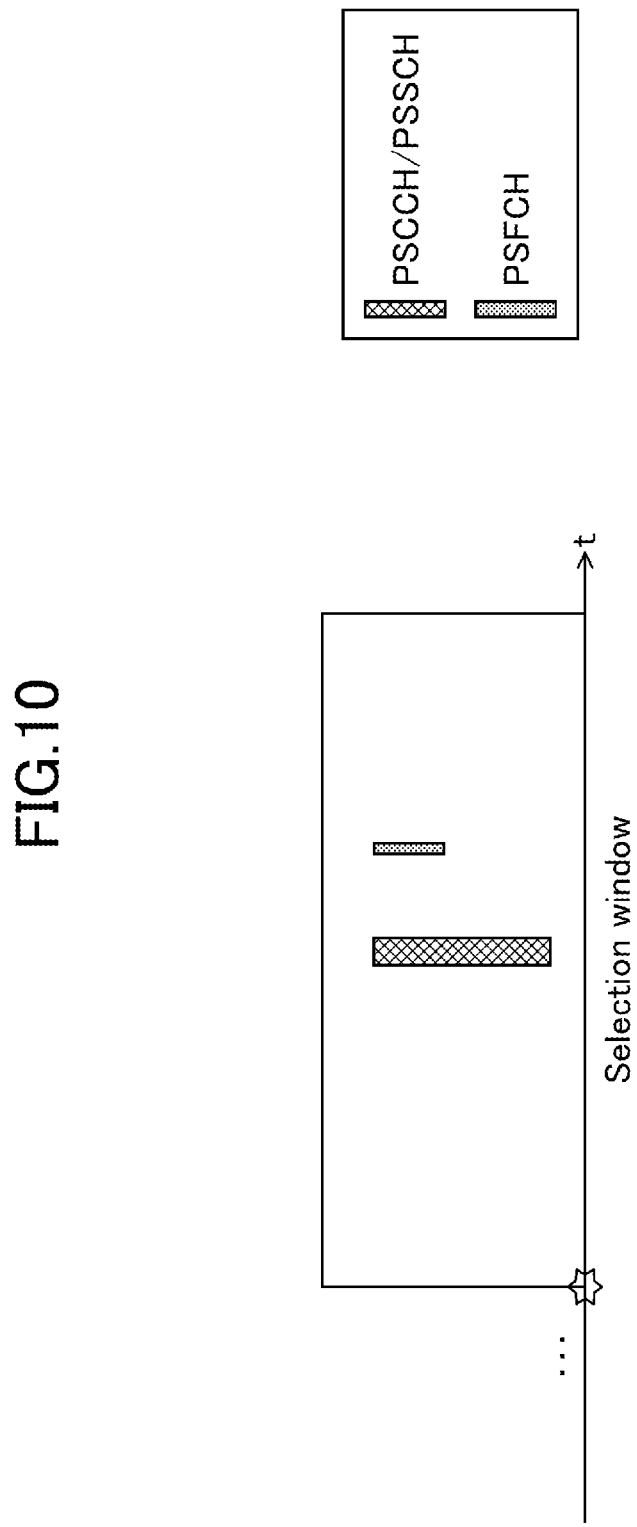
FIG. 10 is a diagram illustrating an example of a selected resource.

In addition, "one resource" may be a PSCCH/PSSCH resource (that is, a PSCCH resource, a PSSCH resource, or a PSCCH resource and a PSSCH resource), may be a PSFCH resource, or may be a set of a PSCCH/PSSCH resource and a PSFCH resource. FIG. 10 illustrates an example in which a PSCCH/PSSCH resource and a PSFCH resource are selected as a set.

In a case where resource selection is performed using a set of a PSCCH/PSSCH resource and a PSFCH resource, for example, since the PSCCH/PSSCH resource and the PSFCH resource are associated with each other, if the PSCCH/PSSCH resource is selected, the PSFCH resource associated with the PSCCH/PSSCH resource may be determined.

In addition, the size of one PSCCH/PSSCH resource may be determined as a size that can accommodate the size of data to be transmitted, or may be a size set in advance, for example. In addition, there is no particular limitation on the granularity of the size of one resource (one PSCCH/PSSCH resource, one PSFCH resource, or the like). For example, the time domain may be set in slot units, subslot units, mini-slot units, symbol units, or subframe units. In addition, for example, the frequency domain may be set in resource block units, subchannel units, or arbitrary frequency units.

Operation Example 2 (Relevant to Step 4)

Basically, before the user equipment 20 selects another resource after selecting a certain resource, the user equipment 20 excludes the already selected resource from the candidate resources. The user equipment 20 selects another resource among the candidate resources excluding the already selected resource.

In Operation Example 2, after the user equipment 20 selects one resource, and before selecting another resource, the user equipment 20 excludes, from the candidate resources, not only the already selected resource but also additional resources (for convenience, this is referred to as a resource α). The user equipment 20 selects another resource from the candidate resources excluding "the already selected resource+the resource α".

For example, before the user equipment 20 selects another resource after selecting a PSCCH/PSSCH resource and a PSFCH resource associated with the PSCCH/PSSCH resource, the user equipment 20 excludes the PSCCH/PSSCH resource and the PSFCH resource from the candidate resources and excludes resources between the PSCCH/PSSCH resource and the PSFCH resource in the time domain. An example of the resource excluded in this manner is illustrated in FIG. 11.

Figure 11:
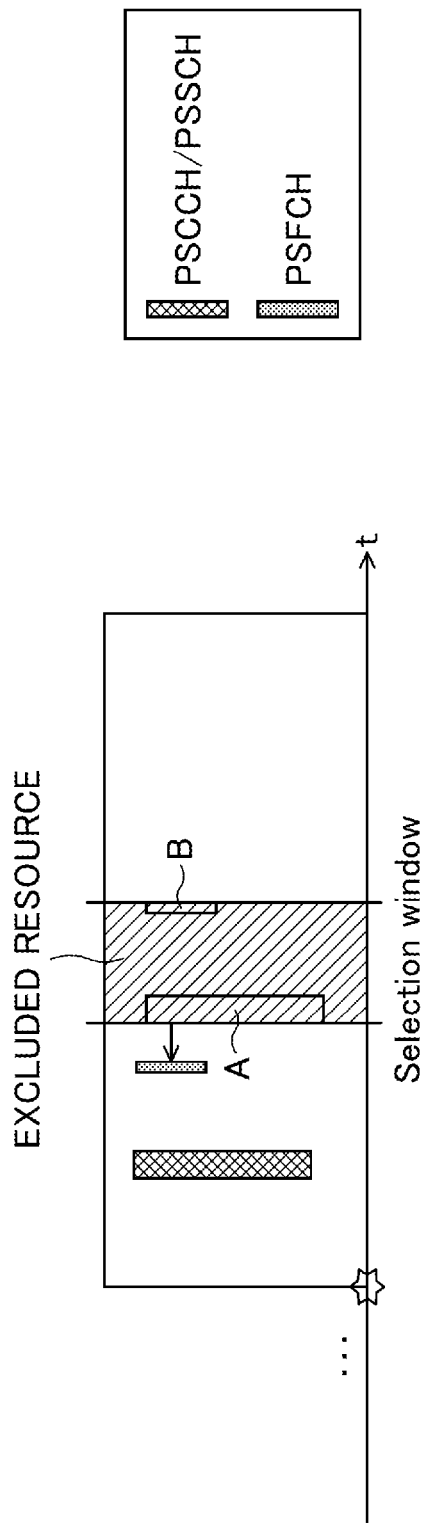
FIG. 11 is a diagram illustrating an example of a selected resource.

By performing such exclusion, for example, it is possible to avoid selecting other resources between the PSCCH/PSSCH resource indicated by A and the PSFCH resource indicated by B in FIG. 11. Therefore, the user equipment 20 can appropriately perform data transmission using the PSCCH/PSSCH resource indicated by A and HARQ-ACK feedback reception using the PSFCH resource indicated by B.

In addition, for example, before the user equipment 20 selects another resource after selecting the PSCCH/PSSCH resource, the user equipment 20 may exclude, from the candidate resources, not only the already selected PSCCH/PSSCH resource but also a resource having a predetermined time width immediately after the PSCCH/PSSCH resource in the time domain. Therefore, for example, in the case of selecting the PSFCH resource after selecting the PSCCH/PSSCH resource, it is possible to prevent the PSFCH resource from becoming too close to the PSCCH/PSSCH resource in the time domain.

In addition, for example, before the user equipment 20 selects another resource after selecting a PSCCH/PSSCH resource and a PSFCH resource associated with the PSCCH/PSSCH resource, the user equipment 20 may exclude the PSCCH/PSSCH resource and the PSFCH resource from the candidate resources and exclude, from the candidate resources, a resource having a predetermined time width immediately before the PSCCH/PSSCH resource in the time domain. Instead of or in addition to excluding, from the candidate resources, a resource having a predetermined time width immediately before the PSCCH/PSSCH resource, a resource having a predetermined time width immediately after the PSFCH resource in the time domain may be excluded from the candidate resources. Therefore, for example, it is possible to avoid a case where the PSFCH resource and the immediately succeeding PSCCH/PSSCH resource become too close to each other in the time domain and cannot be used for HARQ-ACK based retransmission.

Operation Example 3 (Relevant to Step 2)

When selecting a resource from candidate resources remaining without being excluded, the user equipment 20 selects a resource according to the constraint. The user equipment 20 may randomly select a resource within the range of candidate resources according to the constraint. The constraint is, for example, a constraint on a positional relationship in the time domain between a resource to be selected and a selected specific resource.

As an example, when selecting the PSCCH/PSSCH resource and the PSFCH resource associated with the PSCCH/PSSCH resource, the user equipment 20 performs an operation of the following Option 1 or Option 2.

Option 1: When there is a previously selected PSCCH/PSSCH resource, the user equipment 20 selects a PSCCH/PSSCH resource and a PSFCH resource such that the PSFCH resource to be selected comes before the selected PSCCH/PSSCH resource in the time domain.

Option 2: When there is a previously selected PSFCH resource, a PSCCH/PSSCH resource and a PSFCH resource are selected such that the PSCCH/PSSCH resource to be selected comes after the selected PSFCH resource in the time domain.

Note that, when Code Block Group (CBG) based transmission or groupcast is considered, the user equipment 20 may select a plurality of PSFCH resources for one PSCCH/PSSCH resource. In this case, the "PSFCH resource to be selected" in Option 1 is the last PSFCH resource among the plurality of PSFCH resources. The "selected PSFCH resource" in Option 2 is the last PSFCH resource among the plurality of PSFCH resources.

FIG. 11 illustrates an example of the execution result of Option 1. As illustrated in FIG. 11, as an execution result of Option 1, a PSFCH resource is selected before the selected PSCCH/PSSCH resource.

As another example of the constraint, in the case of selecting the PSCCH/PSSCH resource and the PSFCH resource separately, there may be a constraint that the time between the PSCCH/PSSCH resource and the PSFCH resource is equal to or longer than a predetermined time. In addition, there may be the following constraints.

It is assumed that the user equipment 20 performs an operation of transmitting a signal for resource reservation in order to reserve a resource for retransmission based on HARQ-ACK feedback. In this case, when the user equipment 20 selects a PSCCH/PSSCH resource and a resource for transmission of a resource reservation signal (may be referred to as "resource reservation signaling"), which is associated with the PSCCH/PSSCH resource, from candidate resources remaining without being excluded, the user equipment 20 performs the selection such that the resource reservation signal resource to be selected comes after the selected PSFCH resource in the time domain. Note that, when a plurality of PSFCH resources have been selected, the "selected PSFCH resource" is the last PSFCH resource among the plurality of selected PSFCH resources.

Figure 12:
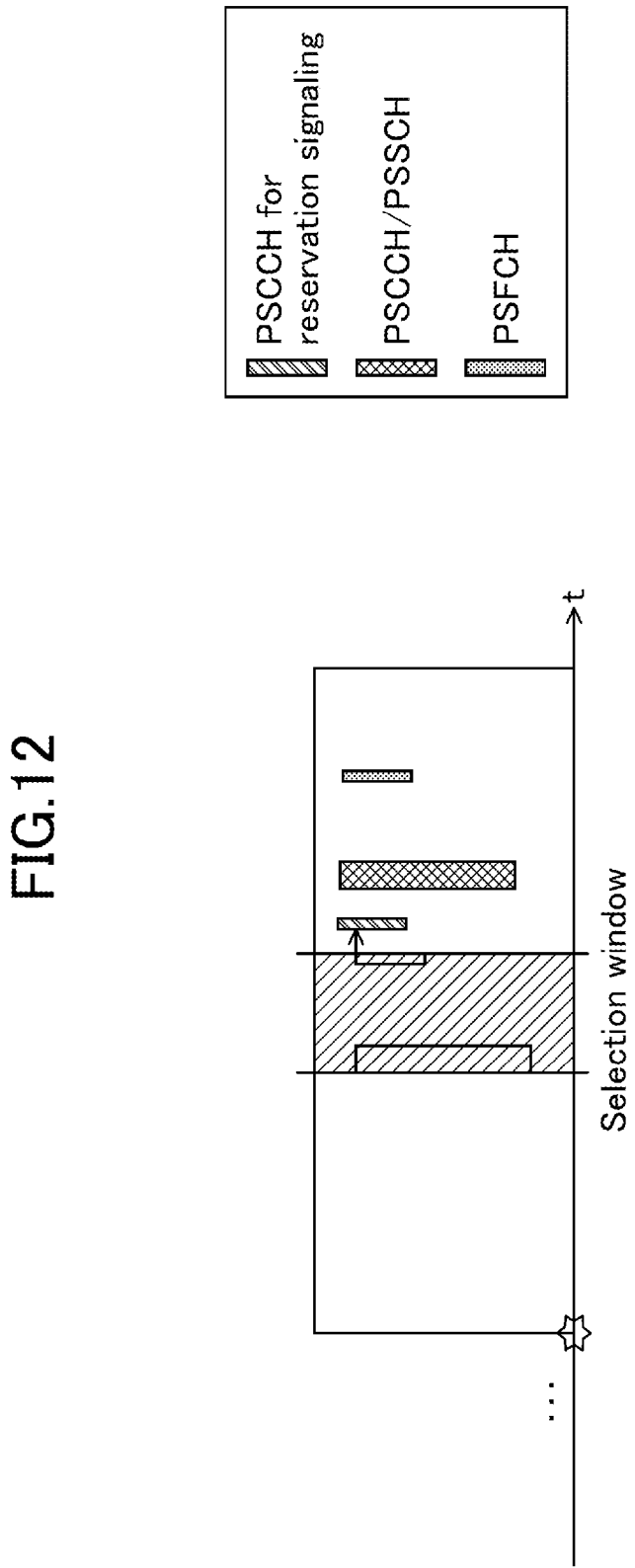
FIG. 12 is a diagram illustrating an example of a selected resource.

FIG. 12 illustrates an example in which a selection is made under the constraint. As illustrated in FIG. 12, a resource reservation signal resource (PSCCH resource in the example of FIG. 12) is selected after the selected PSFCH resource. Note that, the signal for resource reservation can also be applied to transmission (for example, initial transmission and/or retransmission not based on HARQ-ACK) that is not relevant to HARQ-ACK feedback. Also in this case, the above-described constraint may be applied.

By performing such resource selection, the user equipment 20 can quickly execute resource reservation for retransmission when NACK is received on the PSFCH resource.

Operation Example 4 (Relevant to Steps 2 to 4)

Operation Examples 1 to 3 may be combined. In this case, for example, the user equipment 20 executes Operation Example 1 in step 2 to be executed first, and then executes Operation Example 2 in step 4. In addition, the user equipment 20 executes Operation Example 1 in step 2 to be executed first, excludes only the selected resources in step 4, and executes Operation Example 3 in step 2 to be executed next.

In addition, the user equipment 20 executes Operation Example 1 in step 2 to be executed first, executes Operation Example 2 in step 4, and executes Operation Example 3 in step 2 to be executed thereafter. The user equipment 20 repeats this operation until N resources are selected, for example.

Operation Example 5 (Relevant to Step 3)

When the number of selected resources is less than N after the user equipment 20 performs one or more operations of Operation Examples 1 to 4, the user equipment 20 may perform one or both operations of Operation Examples 2 and 3.

Operation Example 6 (Relevant to Step 3)

When the number of selected resources is less than N after the user equipment 20 performs one or more operations of Operation Examples 1 to 4, if neither the execution conditions of Operation Example 2 nor the execution conditions of Operation Example 3 are satisfied (that is, if neither Operation Example 2 nor Operation Example 3 can be executed), the user equipment 20 executes the following Option 1 or Option 2, for example.

Option 1

The user equipment 20 randomly selects a resource from the candidate resources without considering (executing) any of the "+α" resource exclusion in Operation Example 2 and the constraint in Operation Example 3.

Option 2

The user equipment 20 does not make any further resource selection. That is, the resource selection ends. In this case, as a result of the resource selection, a number of resources less than N are selected.

Note that, when any one of Operation Example 2 and Operation Example 3 can be executed, the user equipment 20 may execute the operation that can be executed, or may execute any of the above-described Option 1 and Option 2.

Figure 13:
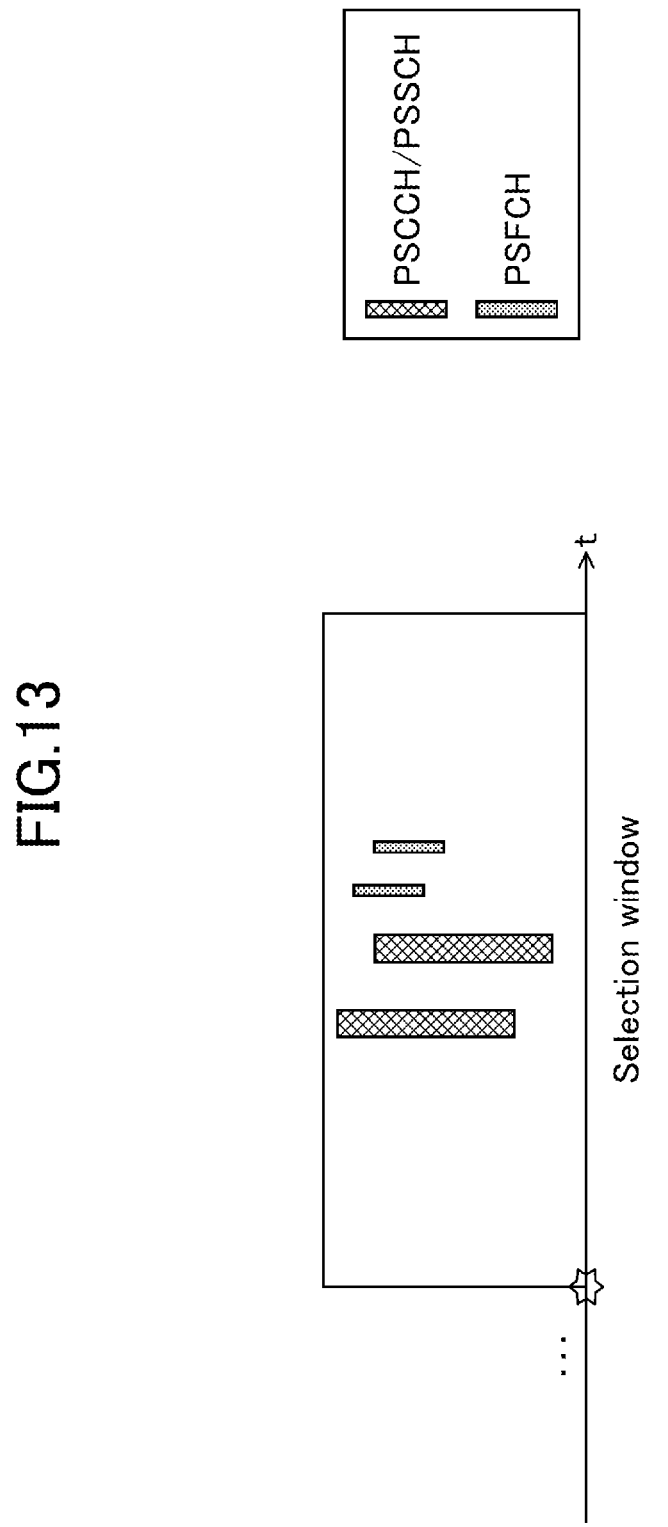
FIG. 13 is a diagram illustrating an example of a selected resource.

FIG. 13 illustrates an example of a case where Option 1 of Operation Example 6 is executed. As illustrated in FIG. 13, for example, the constraint that the PSFCH resource is disposed before the PSCCH/PSSCH resource is not satisfied.

Other Resource Selection Examples

Figure 14:
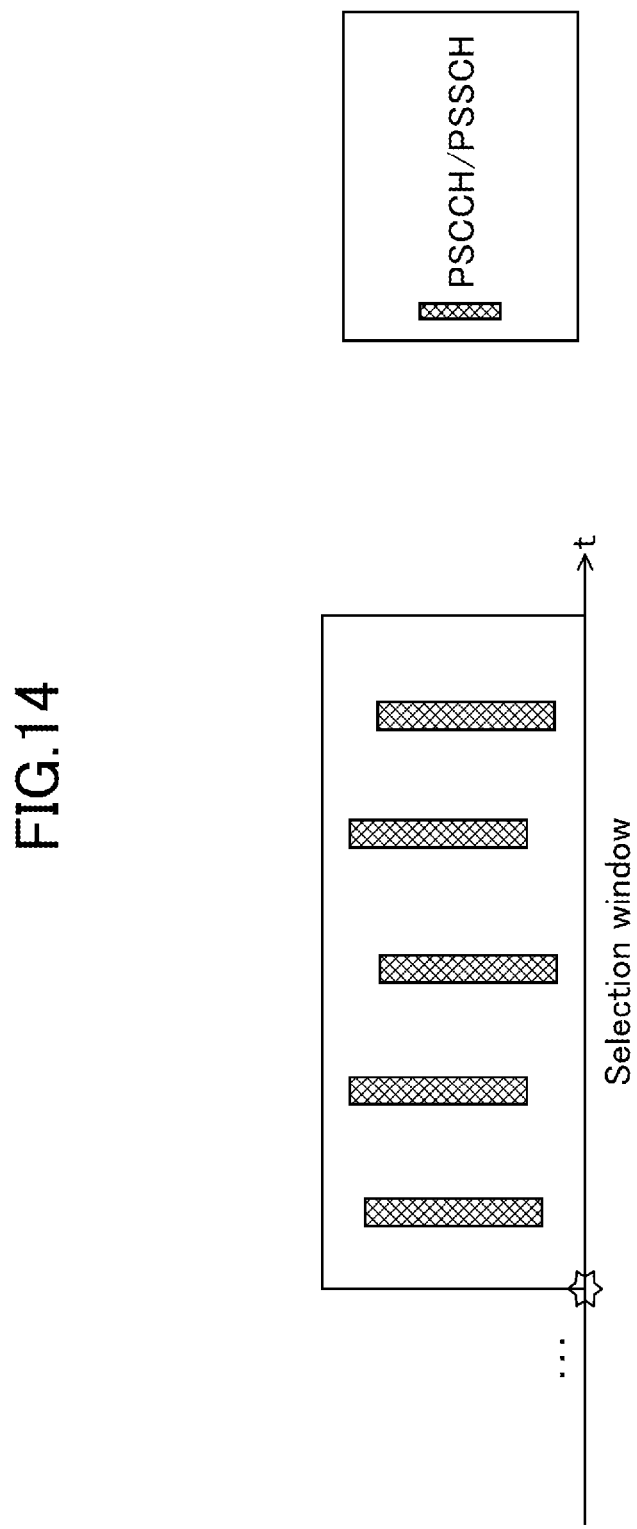
FIG. 14 is a diagram illustrating an example of a selected resource.

The user equipment 20 may not perform the HARQ-ACK feedback operation using the PSFCH based on configuration from the base station apparatus 10 or its own determination. In this case, for example, as illustrated in FIG. 14, only the PSCCH/PSSCH resource may be selected.

According to Example 1 described above, it is possible to select a sufficient number of resources in consideration of HARQ-ACK feedback.

EXAMPLE 2

Next, as Example 2, an example of a transmission method using selected resources will be described. In Example 2, the user equipment 20 executes the following Option 1 or Option 2.

Option 1

The user equipment 20 executes data transmission (or data retransmission) using a resource with the earliest time, that is, a resource with a minimum time index among the selected resources. The resource herein may be a single resource or a plurality of resources.

When transmission (or retransmission) is successful, unused resources are dropped. When resources are dropped, the user equipment 20 may notify other user equipments of the dropped resources (that is, release of the resources).

Regarding the use of a plurality of resources, for example, in a case where the resource selection illustrated in FIG. 13 is made, the user equipment 20 performs transmission using, for example, a plurality of PSCCH/PSSCH resources before the earliest PSFCH resource.

Whether or not the selected resource is used depends on the result of the HARQ-ACK feedback. If the user equipment 20 receives the ACK, resources thereafter are not used.

Figure 15:
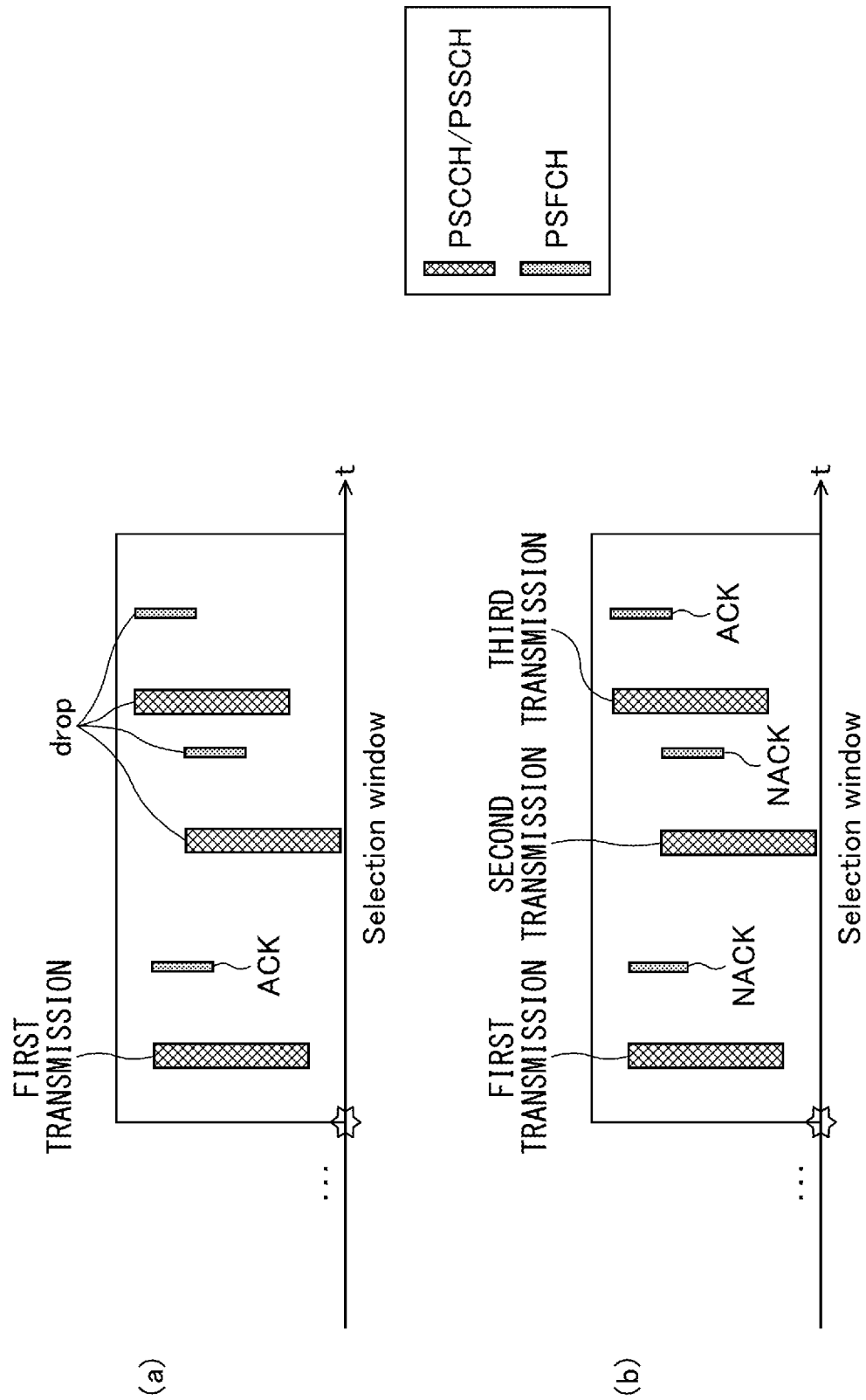
FIG. 15 is a diagram for describing an example of data transmission.

For example, as illustrated in FIG. 15(a), the user equipment 20 performs first data transmission on the initial PSCCH/PSSCH resource. At this time, for example, the data destination is notified of the PSFCH resource through the PSCCH. Then, when the user equipment 20 receives the ACK for the first transmission, resources thereafter are dropped.

In the example illustrated in FIG. 15(b), the user equipment 20 receives ACK after performing two retransmissions (second transmission and third transmission). In this case, the selected resource is not dropped.

Figure 16:
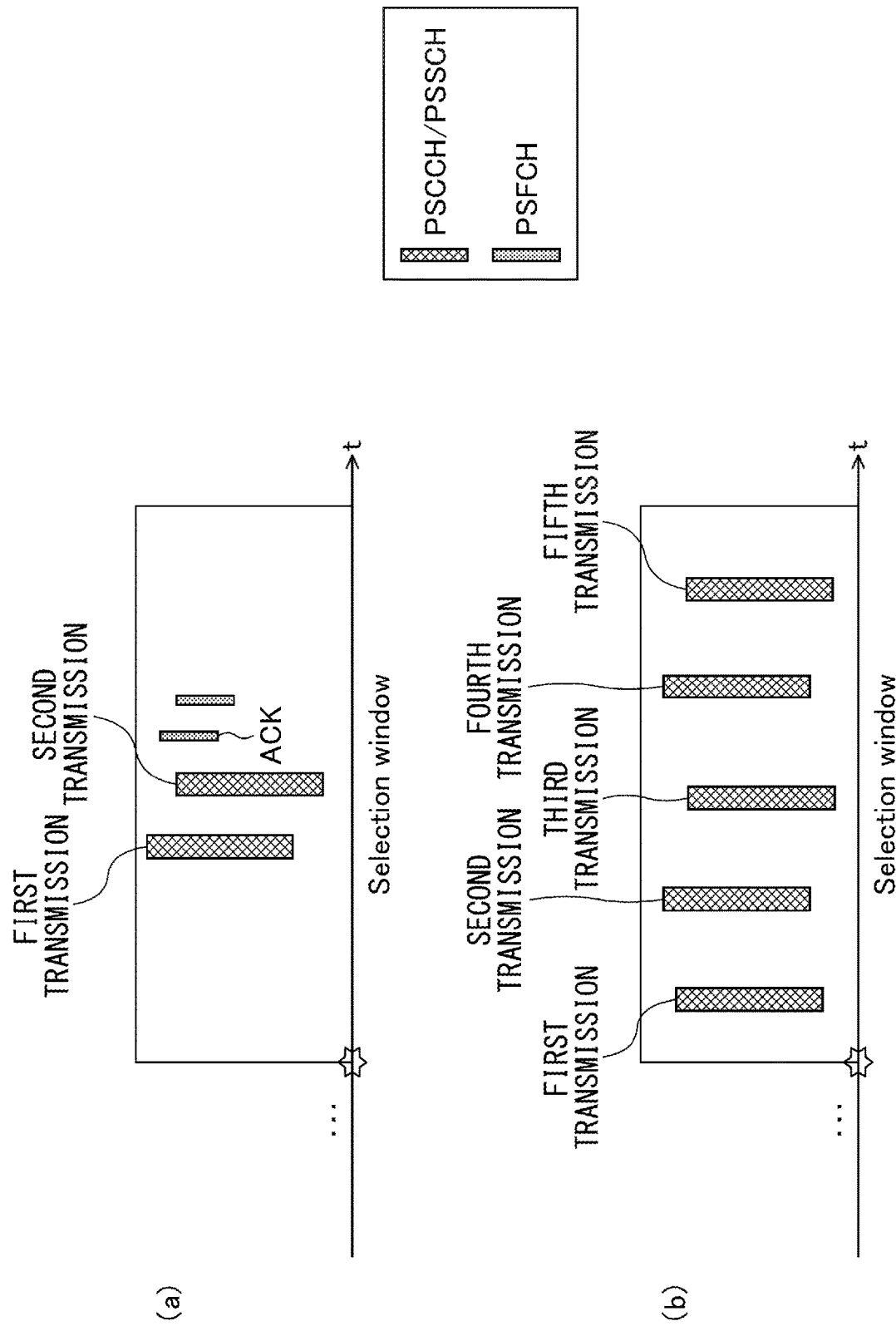
FIG. 16 is a diagram for describing an example of data transmission.

In addition, in the example of FIG. 16(a), the user equipment 20 performs transmission twice using two PSCCH/PSSCH resources before the earliest PSFCH resource, and receives ACK on the earliest PSFCH resource.

Option 2

The user equipment 20 performs data transmission on all the selected resources. All the resources herein may be all PSCCH/PSSCH resources. For example, as in the example illustrated in FIG. 15(b), the user equipment 20 performs transmission (repeated transmission three times) on all the PSCCH/PSSCH resources. In Option 2, the user equipment 20 may not perform the operation based on the HARQ-ACK feedback even when the HARQ-ACK feedback is received.

In addition, as illustrated in FIG. 16(b), when only five PSCCH/PSSCH resources are selected, the user equipment 20 repeatedly performs transmission five times.

In addition, as a matter common to Options 1 and 2, when additional resources are required for data transmission (or retransmission), the user equipment 20 triggers resource selection (here, reselection) to perform the resource selection described in Example 1.

According to Example 2, the user equipment 20 can efficiently perform transmission using a plurality of selected resources.

Effects of Embodiment

According to the technique according to the present embodiment described above, it is possible to select a sufficient number of resources necessary for data transmission (or retransmission) based on the HARQ-ACK feedback.

In addition, the technique according to the present embodiment can be applied without depending on the type (for example, chain reservation based, short term reservation based or random selection based) of the resource selection mechanism of the resource allocation mode 2.

Equipment Configuration

Next, functional configuration examples of the base station apparatus 10 and the user equipment 20 that execute the processing and the operations described up to now will be described. The base station apparatus 10 and the user equipment 20 have all functions in the embodiment described above. However, each of the base station apparatus 10 and the user equipment 20 may have only some (for example, only Example 1 or only Example 2) of all functions in the embodiment.

Base Station Apparatus 10

Figure 17:
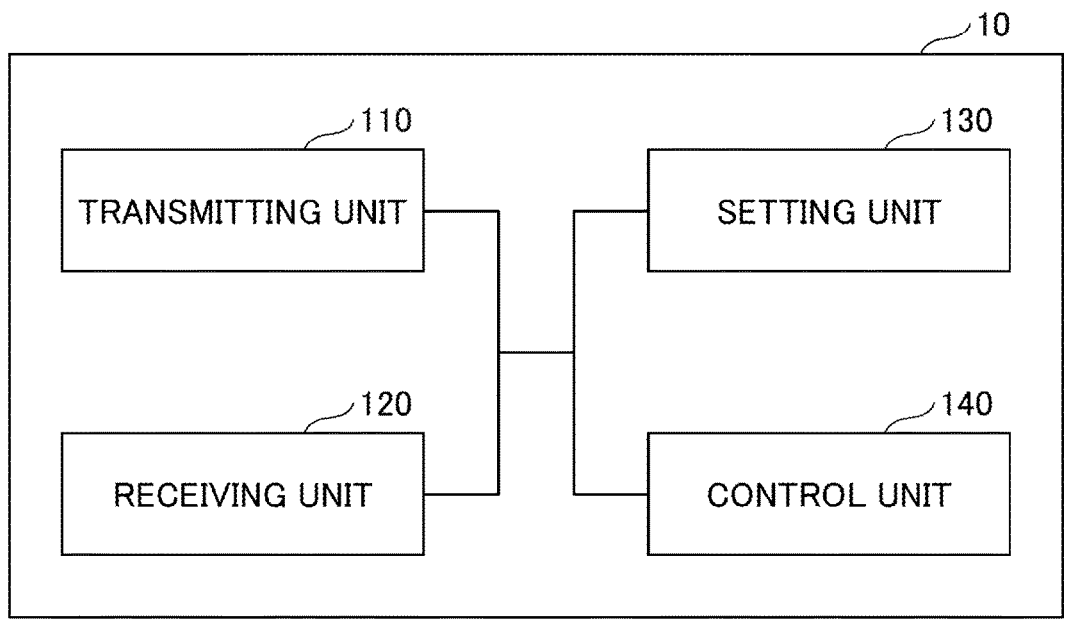
FIG. 17 is a diagram illustrating an example of the functional configuration of a base station apparatus 10 according to an embodiment of the invention.

FIG. 17 is a diagram illustrating an example of the functional configuration of the base station apparatus 10. As illustrated in FIG. 17, the base station apparatus 10 includes a transmitting unit 110, a receiving unit 120, a setting unit 130, and a control unit 140. The functional configuration illustrated in FIG. 17 is only an example. As long as the operation according to the embodiment of the invention can be performed, any functional division and any name of each functional unit may be applied.

The transmitting unit 110 has a function of generating a signal to be transmitted to the user equipment 20 and transmitting the signal wirelessly. The receiving unit 120 has a function of receiving various signals transmitted from the user equipment 20 and acquiring, for example, information of higher layers from the received signals. In addition, the transmitting unit 110 has a function of transmitting NR-PSS, NR-SSS, NR-PBCH, a DL/UL control signal, a DL reference signal, an RRC message, and the like to the user equipment 20.

The setting unit 130 stores a configuration information set in advance and various configurations to be transmitted to the user equipment 20 in a storage device provided in the setting unit 130, and reads out the configuration from the storage device as necessary. The content of the configuration is, for example, information regarding the setting of N. The control unit 140 controls the base station apparatus 10. A functional unit relevant to signal transmission in the control unit 140 may be included in the transmitting unit 110, and a functional unit relevant to signal reception in the control unit 140 may be included in the receiving unit 120.

User Equipment 20

Figure 18:
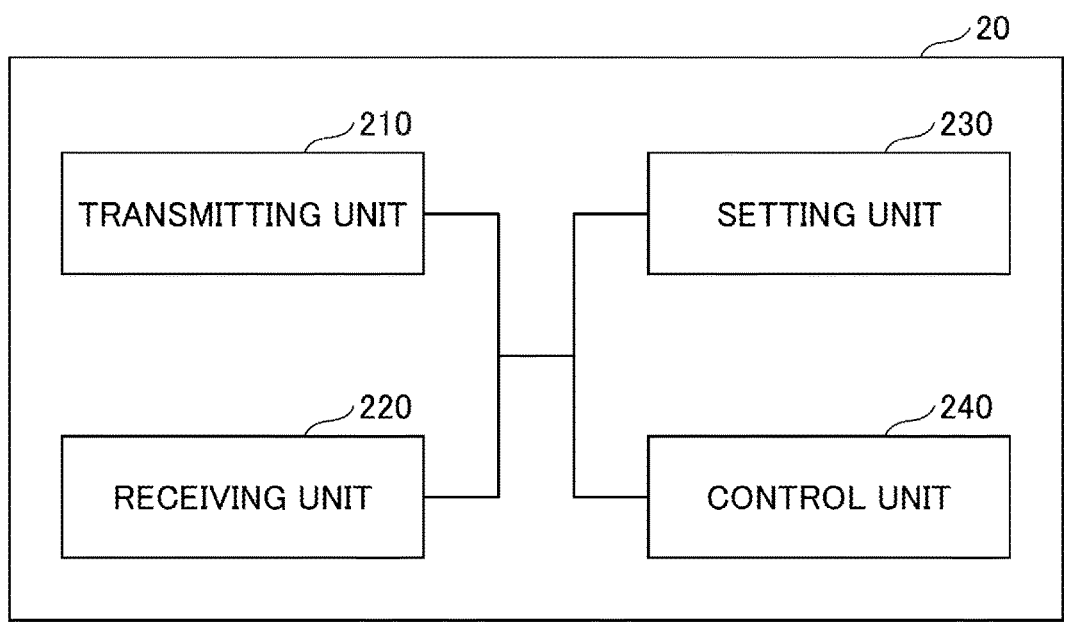
FIG. 18 is a diagram illustrating an example of the functional configuration of a user equipment 20 according to an embodiment of the invention.

FIG. 18 is a diagram illustrating an example of the functional configuration of the user equipment 20. As illustrated in FIG. 18, the user equipment 20 includes a transmitting unit 210, a receiving unit 220, a setting unit 230, and a control unit 240. The functional configuration illustrated in FIG. 18 is only an example. As long as the operation according to the embodiment of the invention can be performed, any functional division and any name of each functional unit may be applied.

The transmitting unit 210 generates a transmission signal from transmission data, and transmits the transmission signal wirelessly. The receiving unit 220 wirelessly receives various signals, and acquires a higher-layer signal from the received physical layer signal. In addition, the receiving unit 220 has a function of receiving NR-PSS, NR-SSS, NR-PBCH, a DL/UL/SL control signal, an RRC message, a reference signal, and the like transmitted from the base station apparatus 10. In addition, for example, the transmitting unit 210 transmits Physical Sidelink Control Channel (PSCCH), Physical Sidelink Shared Channel (PSSCH), Physical Sidelink Discovery Channel (PSDCH), Physical Sidelink Broadcast Channel (PSBCH), and Physical Sidelink Feedback Channel (PSFCH) to another user equipment 20 as sidelink communication, and the receiving unit 220 receives the PSCCH, the PSSCH, the PSDCH, the PSBCH, the PSFCH, and the like from another user equipment 20.

The setting unit 230 stores various configurations, which have been received from the base station apparatus 10 or another user equipment 20 by the receiving unit 220, in a storage device provided in the setting unit 230, and reads out the configuration from the storage device as necessary. The setting unit 230 also stores the configuration set in advance. The content of the configuration is, for example, information regarding the setting of N. The control unit 240 controls the user equipment 20. In addition, the control unit 240 performs the resource selection operation described in Examples 1 and 2. A functional unit relevant to signal transmission in the control unit 240 may be included in the transmitting unit 210, and a functional unit relevant to signal reception in the control unit 240 may be included in the receiving unit 220.

Hardware Configuration

The block diagrams (FIGS. 17 and 18) used in the description of the above embodiment illustrate blocks in functional units. These functional blocks (configuration units) are realized by any combination of at least one of hardware and software. In addition, a method of realizing each functional block is not particularly limited. That is, each functional block may be realized using one physically or logically coupled device, or may be realized by connecting two or more physically or logically separated devices directly or indirectly (for example, using a wired or wireless connection) and using the plurality of devices. Each functional block may be realized by combining the above-described one device or the above-described plurality of devices with software.

Functions include determining, judging, calculating, computing, processing, deriving, investigating, looking up, ascertaining, receiving, transmitting, output, access, resolving, selecting, choosing, establishing, comparing, assuming, expecting, regarding, broadcasting, notifying, communicating, forwarding, configuring, reconfiguring, allocating, mapping, assigning, and the like, but are not limited thereto. For example, a functional block (configuration unit) that makes transmission function is called a transmitting unit or a transmitter. In any case, as described above, the realization method is not particularly limited.

Figure 19:
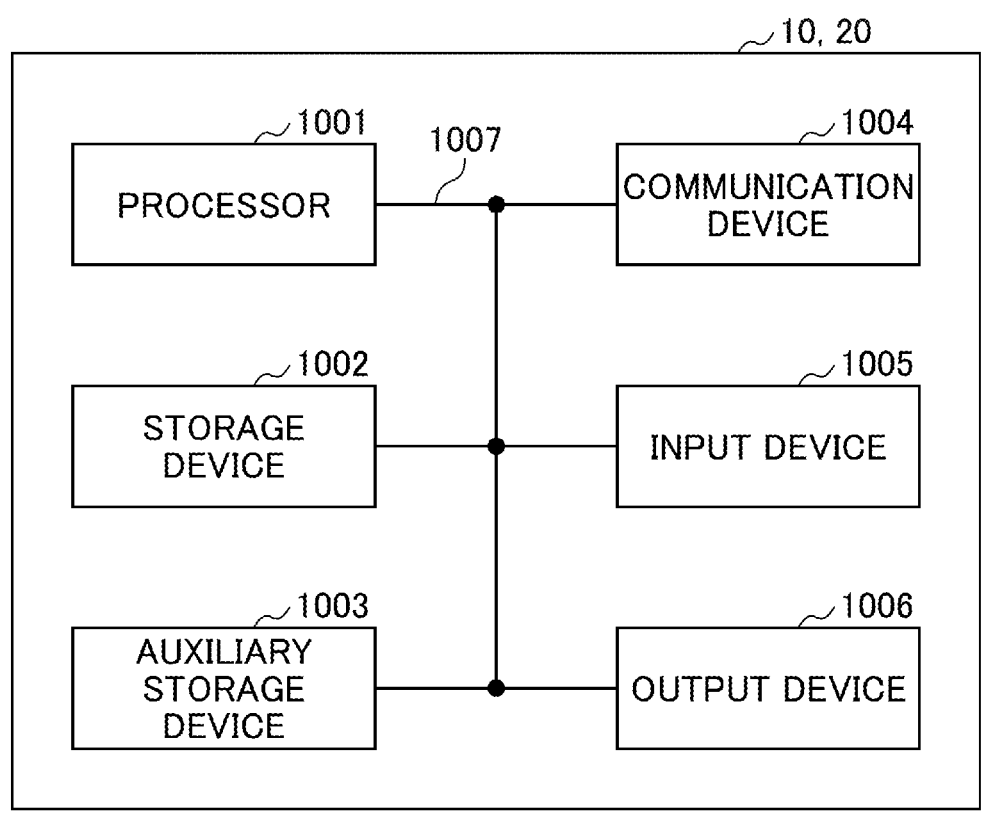
FIG. 19 is a diagram illustrating an example of the hardware configuration of a base station apparatus 10 or a user equipment 20 according to an embodiment of the invention.

For example, the base station apparatus 10, the user equipment 20, and the like according to an embodiment of the present disclosure may function as a computer that performs processing of the radio communication method according to the present disclosure. FIG. 19 is a diagram illustrating an example of the hardware configuration of the base station apparatus 10 and the user equipment 20 according to an embodiment of the present disclosure. Each of the base station apparatus 10 and the user equipment 20 described above may be physically configured as a computer apparatus including a processor 1001, a storage device 1002, an auxiliary storage device 1003, a communication device 1004, an input device 1005, an output device 1006, a bus 1007, and the like.

In addition, in the following description, the term "device" can be read as a circuit, a unit, and the like. The hardware configuration of each of the base station apparatus 10 and the user equipment 20 may be configured to include one or more devices for each device illustrated in the diagram, or may be configured not to include some devices.

Each function in the base station apparatus 10 and the user equipment 20 can be realized by reading predetermined software (program) onto hardware, such as the processor 1001 and the storage device 1002, so that the processor 1001 performs an operation and controlling communication using the communication device 1004 or controlling at least one of reading and writing of data in the storage device 1002 and the auxiliary storage device 1003.

The processor 1001 controls the entire computer by operating an operating system, for example. The processor 1001 may be configured by a central processing unit (CPU) including an interface with peripheral equipment, a control device, an operation device, a register, and the like. For example, the control unit 140, the control unit 240, and the like described above may be realized by the processor 1001.

In addition, the processor 1001 reads a program (program code), a software module, data, and the like into the storage device 1002 from at least one of the auxiliary storage device 1003 and the communication device 1004, and executes various kinds of processing according to these. As the program, a program causing a computer to execute at least a part of the operation described in the above embodiment is used. For example, the control unit 140 of the base station apparatus 10 illustrated in FIG. 17 may be realized by a control program that is stored in the storage device 1002 and operated by the processor 1001. In addition, for example, the control unit 240 of the user equipment 20 illustrated in FIG. 18 may be realized by a control program that is stored in the storage device 1002 and operated by the processor 1001. Although it has been described that the various kinds of processing described above are executed by one processor 1001, the various kinds of processing described above may be executed simultaneously or sequentially by two or more processors 1001. The processor 1001 may be implemented by one or more chips. In addition, the program may be transmitted from a network through a telecommunication line.

The storage device 1002 is a computer-readable recording medium, and may be configured by at least one of, for example, a Read Only Memory (ROM), an Erasable Programmable ROM (EPROM), an Electrically Erasable Programmable ROM (EEPROM), and a Random Access Memory (RAM). The storage device 1002 may be called a register, a cache, a main memory, and the like. The storage device 1002 can store a program (program code), a software module, and the like that can be executed to execute the communication method according to an embodiment of the present disclosure.

The auxiliary storage device 1003 is a computer-readable recording medium, and may be configured by at least one of, for example, an optical disk such as a Compact Disc ROM (CD-ROM), a hard disk drive, a flexible disk, and a magneto-optical disk (for example, a compact disk, a digital versatile disk, and a Blu-ray (Registered trademark) disk), a smart card, a flash memory (for example, a card, a stick, a key drive), a floppy (registered trademark) disk, and a magnetic strip. The storage medium described above may be, for example, a database including at least one of the storage device 1002 and the auxiliary storage device 1003, a server, or other appropriate media.

The communication device 1004 is hardware (transmitting and receiving device) for performing communication between computers through at least one of a wired network and a radio network, and is also referred to as, for example, a network device, a network controller, a network card, and a communication module. The communication device 1004 may be configured to include, for example, a high-frequency switch, a duplexer, a filter, a frequency synthesizer, and the like in order to realize at least one of frequency division duplex (FDD) and time division duplex (TDD), for example. For example, a transmitting and receiving antenna, an amplifier unit, a transmitting and receiving unit, a transmission line interface, and the like may be realized by the communication device 1004. The transmitting and receiving unit may be implemented so as to be physically or logically separated from the transmitting unit and the receiving unit.

The input device 1005 is an input device (for example, a keyboard, a mouse, a microphone, a switch, a button, and a sensor) for receiving an input from the outside. The output device 1006 is an output device (for example, a display, a speaker, and an LED lamp) that performs output to the outside. In addition, the input device 1005 and the output device 1006 may be integrated (for example, a touch panel).

In addition, respective devices, such as the processor 1001 and the storage device 1002, are connected to each other by the bus 1007 for communicating information. The bus 1007 may be configured using a single bus, or may be configured using a different bus for each device.

In addition, each of the base station apparatus 10 and the user equipment 20 may be configured to include hardware, such as a microprocessor, a digital signal processor (DSP), an Application Specific Integrated Circuit (ASIC), a Programmable Logic Device (PLD), and a Field Programmable Gate Array (FPGA), and some or all of the functional blocks may be realized by the hardware. For example, the processor 1001 may be implemented using at least one of these hardware components.

Summary of Embodiment

In the present embodiment, at least a user equipment and a communication method described in the following articles are provided.

Article 1

A user equipment including: a control unit that selects a sidelink resource from candidate resources excluding a selected resource and a further resource within a predetermined time window; and a transmitting unit that performs transmission or retransmission using the resource selected by the control unit.

Article 2

The user equipment described in Article 1, in which the further resource is a resource between a selected resource for data transmission and a selected resource for HARQ-ACK feedback.

Article 3

A user equipment including: a control unit that selects a sidelink resource under a predetermined constraint from candidate resources within a predetermined time window; and a transmitting unit that performs transmission or retransmission using the selected resource, in which the predetermined constraint is a constraint on a positional relationship in a time domain between a resource to be selected and a selected specific resource.

Article 4

The user equipment described in any one of Articles 1 to 3, further including a receiving unit that receives HARQ-ACK feedback using the resource selected by the control unit.

Article 5

The user equipment described in any one of Articles 1 to 4, in which, when data transmission using a certain resource is successful, the transmitting unit drops an unused resource after the resource.

Article 6

A communication method executed by a user equipment, including: a selection step for selecting a sidelink resource from candidate resources excluding a selected resource and a further resource within a predetermined time window; and a transmission step for performing transmission or retransmission using the resource selected in the selection step.

By any of the techniques in Articles 1 to 6, a technique that enables a user equipment to perform resource selection in consideration of retransmission is provided. In addition, according to Article 2, it is possible to select a resource suitable for the operation of HARQ-ACK feedback. According to Article 4, it is possible to determine whether or not to perform retransmission by receiving the HARQ-ACK feedback. According to Article 5, resources can be effectively used.

Supplement to Embodiment

While the embodiment of the invention has been described above, the disclosed invention is not limited to such an embodiment, and those skilled in the art will understand various variations, modifications, alternatives, substitutions, and the like. Although the description has been made using specific numerical examples to facilitate the understanding of the invention, those numerical values are merely examples and any appropriate values may be used unless otherwise specified. The division of the items in the above description is not essential to the invention, and the matters described in two or more items may be used in combination as necessary, or the matter described in a certain item may be applied to the matter described in another item (unless there is a contradiction). The boundaries between functional units or processing units in the functional block diagrams do not always correspond to the boundaries between physical components. The operation of a plurality of functional units may be physically performed by one component, or the operation of one functional unit may be physically performed by a plurality of components. In the processing procedure described in the embodiment, the order of the processing may be changed as long as there is no contradiction. Although the base station apparatus 10 and the user equipment 20 have been described using functional block diagrams for convenience of description of the processing, such equipment may be realized by hardware, software, or a combination thereof. The software operated by the processor of the base station apparatus 10 according to the embodiment of the invention and the software operated by the processor of the user equipment 20 according to the embodiment of the invention may be stored in a random access memory (RAM), a flash memory, a read only memory (ROM), an EPROM, an EEPROM, a register, a hard disk (HDD), a removable disk, a CD-ROM, a database, a server, or any other appropriate storage media.

In addition, the notification of information is not limited to the aspect/embodiment described in the present disclosure, and may be performed using other methods. For example, the notification of information may be performed using physical layer signaling (for example, Downlink Control Information (DCI), Uplink Control Information (UCI)), higher layer signaling (for example, Radio Resource Control (RRC) signaling, Medium Access Control (MAC) signaling, broadcast information (Master Information Block (MIB), System Information Block (SIB)), other signals, or a combination thereof. In addition, the RRC signaling may be called an RRC message, and may be, for example, an RRC connection setup message or an RRC connection reconfiguration message.

Each aspect/embodiment described in the present disclosure may be applied to at least one of systems, which use Long Term Evolution (LTE), LTE-Advanced (LTE-A), SUPER 3G, IMT-Advanced, 4th generation mobile communication system (4G), 5th generation mobile communication system (5G), Future Radio Access (FRA), and new Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), and other appropriate systems, and next-generation systems extended based on these. In addition, a plurality of systems may be combined (for example, a combination of 5G and at least one of LTE and LTE-A) to be applied.

In the processing procedure, sequence, flowchart, and the like in each aspect/embodiment described in this specification, the order may be changed as long as there is no contradiction. For example, for the methods described in this disclosure, elements of various steps are presented using an exemplary order, and the invention is not limited to the specific order presented.

The specific operation described as being performed by the base station apparatus 10 in this specification may be performed by its upper node in some cases. In a network including one or more network nodes each having the base station apparatus 10, it is obvious that various operations performed for communication with the user equipment 20 can be performed by at least one of the base station apparatus 10 and other network nodes (for example, MME, S-GW, and the like can be considered, but the network node is not limited thereto) other than the base station apparatus 10. Although a case where the number of other network nodes other than the base station apparatus 10 is one has been exemplified above, the other network nodes may be a combination (for example, MME and S-GW) of a plurality of other network nodes.

Information or signals described in the present disclosure can be output from a higher layer (or a lower layer) to a lower layer (or a higher layer). Information or signals described in the present disclosure may be input and output through a plurality of network nodes.

Information or the like that is input and output may be stored in a specific place (for example, a memory) or may be managed using a management table. The information or the like that is input and output can be overwritten, updated, or added. The information or the like that is output may be deleted. The information or the like that is input may be transmitted to another device.

The judging in the present disclosure may be performed based on a value expressed by 1 bit (0 or 1), may be performed based on Boolean (true or false), or may be performed by numerical value comparison (for example, comparison with a predetermined value).

Software, regardless of whether this is called software, firmware, middleware, microcode, a hardware description language, or any other name, should be interpreted broadly to mean instructions, instruction sets, codes, code segments, program codes, programs, subprograms, software modules, applications, software applications, software packages, routines, subroutines, objects, executable files, execution threads, procedures, functions, and the like.

In addition, software, instructions, information, and the like may be transmitted and received through a transmission medium. For example, in a case where software is transmitted from a website, a server, or other remote sources using at least one of the wired technology (coaxial cable, optical fiber cable, twisted pair, digital subscriber line (DSL), and the like) and the wireless technology (infrared, microwave, and the like), at least one of the wired technology and the wireless technology is included within the definition of the transmission medium.

The information, signals, and the like described in this disclosure may be expressed using any of a variety of different technologies. For example, data, instructions, commands, information, signals, bits, symbols, and chips that can be referred to throughout the above description may be represented by voltage, current, electromagnetic waves, magnetic field or magnetic particles, light field or photon, or any combination thereof.

In addition, the terms described in the present disclosure and the terms necessary for understanding the present disclosure may be replaced with terms having the same or similar meaning. For example, at least one of the channel and the symbol may be a signal (signaling). In addition, the signal may be a message. In addition, a component carrier (CC) may be called a carrier frequency, a cell, a frequency carrier, or the like.

The terms "system" and "network" used in this disclosure are used interchangeably.

In addition, the information, parameters, and the like described in the present disclosure may be expressed using an absolute value, may be expressed using a relative value from a predetermined value, or may be expressed using another corresponding information. For example, the radio resource may be indicated by an index.

The names used for the parameters described above are not limiting names in any way. In addition, equations and the like using these parameters may be different from those explicitly disclosed in the present disclosure. Since various channels (for example, a PUCCH and a PDCCH) and information elements can be identified by any suitable names, various names allocated to these various channels and information elements are not limiting names in any way.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", and "component carrier" can be used interchangeably. The base station may also be referred to as terms, such as a macro cell, a small cell, a femto cell, and a pico cell.

The base station can include one or more (for example, three) cells. When the base station includes a plurality of cells, the entire coverage area of the base station can be divided into a plurality of smaller areas, and each of the smaller area can also provide a communication service using a base station subsystem (for example, a remote radio head (RRH). The term "cell" or "sector" refers to a part or the entirety of the coverage area of at least one of a base station and a base station subsystem that provides communication services in this coverage.

In the present disclosure, terms such as "mobile station (MS)", "user terminal", "user equipment (UE)", and "terminal" can be used interchangeably.

The mobile station may also be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms depending on those skilled in the art.

At least one of the base station and the mobile station may be called a transmitting device, a receiving device, a communication device, and the like. In addition, at least one of the base station and the mobile station may be a device mounted on a moving body, the moving body itself, and the like. The moving body may be a vehicle (for example, a car or an airplane), an unmanned moving body (for example, a drone or a self-driving car), or a robot (maned or unmanned). In addition, at least one of the base station and the mobile station necessarily includes a device that does not move during a communication operation. For example, at least one of the base station and the mobile station may be an Internet of Things (IoT) device, such as a sensor.

In addition, the base station in the present disclosure may be read as a user terminal. For example, each aspect/embodiment of the present disclosure may be applied to a configuration in which communication between a base station and a user terminal is replaced with communication between a plurality of pieces of user equipment 20 (which may be called, for example, Device-to-Device (D2D) or Vehicle-to-Everything (V2X)). In this case, the user equipment 20 may have the above-described function of the base station apparatus 10. In addition, terms such as "uplink" and "downlink" may be read as terms corresponding to terminal-to-terminal communication (for example, "side"). For example, an uplink channel, a downlink channel, and the like may be read as a side channel.

Similarly, the user terminal in the present disclosure may be read as a base station. In this case, the base station may have the above-described function of the user terminal.

The terms "determining" used in the present disclosure may involve a wide variety of operations. For example, "determining" can include considering judging, calculating, computing, processing, deriving, investigating, looking up (search, inquiry) (for example, looking up in a table, database, or another data structure), and ascertaining as "determining". In addition, "determining" can include considering receiving (for example, receiving information), transmitting (for example, transmitting information), input, output, accessing (for example, accessing data in a memory) as "determining". In addition, "determining" can include considering resolving, selecting, choosing, establishing, comparing, and the like as "determining". In other words, "determining" can include considering any operation as "determining". In addition, "determining" may be read as "assuming", "expecting", "considering", and the like.

The terms "connected" and "coupled" or variations thereof mean any direct or indirect connection or coupling between two or more elements, and can include a case where one or more intermediate elements are present between two elements "connected" or "coupled" to each other. The coupling or connection between elements may be physical, logical, or a combination thereof. For example, "connection" may be read as "access". When used in this disclosure, two elements can be considered to be "connected" or "coupled" to each other using at least one of one or more wires, cables, and printed electrical connections and using some non-limiting and non-comprehensive examples, such as electromagnetic energy having wavelengths in a radio frequency domain, a microwave domain, and a light (both visible and invisible) domain.

The reference signal may be abbreviated as RS (Reference Signal), and may be called Pilot according to the applied standard.

The description "based on" used in this disclosure does not mean "based only on" unless otherwise specified. In other words, the description "based on" means both "based only on" and "based at least on".

Any reference to elements using designations such as "first" and "second" used in the present disclosure does not generally limit the quantity or order of the elements. These designations can be used in the present disclosure as a convenient method for distinguishing between two or more elements. Therefore, references to first and second elements do not mean that only two elements can be adopted or that the first element should precede the second element in any way.

"Means" in the configuration of each device described above may be replaced with "unit", "circuit", "device", and the like.

When "include", "including", and variations thereof are used in the present disclosure, these terms are intended to be inclusive similarly to the term "comprising". In addition, the term "or" used in the present disclosure is intended not to be an exclusive-OR.

A radio frame may be configured by one or more frames in the time domain. Each of one or more frames in the time domain may be referred to as a subframe. In addition, the subframe may be configured by one or more slots in the time domain. The subframe may be a fixed time length (for example, 1 ms) that does not depend on numerology.

Numerology may be a communication parameter applied to at least one of transmission and reception of a certain signal or channel. Numerology may indicate at least one of, for example, subcarrier spacing (SCS), bandwidth, symbol length, cyclic prefix length, transmission time interval (TTI), the number of symbols per TTI, radio frame configuration, specific filtering processing performed in the frequency domain by the transceiver, and specific windowing processing performed in the time domain by the transceiver.

A slot may be configured by one or more symbols (Orthogonal Frequency Division Multiplexing (OFDM) symbol, Single Carrier Frequency Division Multiple Access (SC-FDMA) symbol, and the like) in the time domain. A slot may be a time unit based on numerology.

A slot may include multiple mini-slots. Each mini-slot may be configured by one or more symbols in the time domain. In addition, the mini-slot may be called a subslot. A mini-slot may be configured by a smaller number of symbols than that in a slot. A PDSCH (or a PUSCH) transmitted in time units larger than the mini-slot may be referred to as PDSCH (or PUSCH) mapping type A. A PDSCH (or a PUSCH) transmitted using a mini-slot may be referred to as PDSCH (or PUSCH) mapping type B.

Each of the radio frame, the subframe, the slot, the mini-slot, and the symbol indicates a time unit when transmitting a signal. The radio frame, the subframe, the slot, the mini-slot, and the symbol may have different names corresponding thereto.

For example, one subframe may be called a transmission time interval (TTI), a plurality of consecutive subframes may be called a TTI, and one slot or one mini-slot may be called a TTI. That is, at least one of the subframe and the TTI may be a subframe (1 ms) in the known LTE, a period (for example, 1 to 13 symbols) shorter than 1 ms, or a period longer than 1 ms. In addition, the unit indicating the TTI may be called a slot, a mini-slot, or the like, instead of a subframe.

Here, the TTI refers to, for example, a minimum time unit of scheduling in radio communication. For example, in the LTE system, the base station performs scheduling for allocating radio resources (frequency bandwidth, transmission power, and the like that can be used in each user equipment 20) to each user equipment 20 in TTI units. In addition, the definition of the TTI is not limited to this.

The TTI may be a transmission time unit, such as a channel-encoded data packet (transport block), a code block, and a code word, or may be a processing unit, such as scheduling and link adaptation. In addition, when a TTI is given, a time section (for example, the number of symbols) in which a transport block, a code block, a code word, and the like are actually mapped may be shorter than the TTI.

In addition, when one slot or one mini-slot is called a TTI, one or more TTIs (that is, one or more slots or one or more mini-slots) may be a minimum time unit for scheduling. In addition, the number of slots (the number of mini-slots) configuring the minimum time unit of the scheduling may be controlled.

A TTI having a time length of 1 ms may be called a normal TTI (TTI in LTE Rel. 8-12), a long TTI, a normal subframe, a long subframe, a slot, and the like. A TTI shorter than the normal TTI may be called a short TTI, a partial or fractional TTI, a short subframe, a mini-slot, a subslot, a slot, and the like.

In addition, a long TTI (for example, a normal TTI or a subframe) may be read as a TTI having a time length exceeding 1 ms, and a short TTI may be read as a TTI shorter than the TTI length of the long TTI and equal to or longer than 1 ms.

A resource block (RB) is a resource allocation unit in the time domain and the frequency domain, and may include one or more consecutive subcarriers in the frequency domain. The number of subcarriers included in the RB may be the same regardless of numerology, and may be, for example, 12. The number of subcarriers included in the RB may be determined based on numerology.

In addition, the time domain of the RB may include one or more symbols, and may be the length of one slot, one mini-slot, one subframe, or one TTI. One TTI, one subframe, and the like may each be configured by one or more resource blocks.

In addition, one or more RBs may be called a physical resource block (PRB: Physical RB), a sub-carrier group (SCG), a resource element group (REG), a PRB pair, an RB pair, and the like.

In addition, the resource block may be configured by one or more resource elements (REs). For example, one RE may be a radio resource area of one subcarrier and one symbol.

A bandwidth part (BWP) (which may be called a partial bandwidth or the like) may indicate a subset of consecutive common resource blocks (common RBs) for certain numerology in a certain carrier. Here, the common RB may be specified by an index of the RB with the common reference point of the carrier as a reference. The PRB may be defined by a certain BWP and numbered within the BWP.

The BWP may include a BWP for UL (UL BWP) and a BWP for DL (DL BWP). For the UE, one or more BWPs may be set in one carrier.

At least one of the set BWPs may be active, and it may not be assumed that the UE transmits and receives a predetermined signal/channel outside the active BWP. In addition, "cell", "carrier", and the like in the present disclosure may be read as "BWP".

The structures of the radio frame, the subframe, the slot, the mini-slot, and the symbol described above are merely examples. For example, the number of subframes included in a radio frame, the number of slots per subframe or radio frame, the number of mini-slots included in a slot, the number of symbols and RBs included in a slot or mini-slot, the number of subcarriers included in an RB, the number of symbols in the TTI, the symbol length, the cyclic prefix (CP) length, and the like can be changed in various ways.

In the present disclosure, in a case where articles, for example, a, an, and the in English, are added by translation, the present disclosure may include that nouns subsequent to these articles are plural.

In the present disclosure, the expression "A and B are different" may mean "A and B are different from each other". In addition, the expression may mean that "A and B each are different from C". Terms such as "separate", "coupled" may be interpreted similarly to "different".

Each aspect/embodiment described in the present disclosure may be used alone, may be used in combination, or may be switched and used according to execution. In addition, the notification of predetermined information (for example, notification of "X") is not limited to being explicitly performed, and may be performed implicitly (for example, without the notification of the predetermined information).

In the present disclosure, the sidelink communication is an example of the direct communication between terminals. The SCI is an example of control information for direct communication between terminals. A slot is an example of a predetermined time domain.

While the present disclosure has been described in detail, it is apparent to those skilled in the art that the present disclosure is not limited to the embodiment described in the present disclosure. The present disclosure can be implemented as modified and changed aspects without departing from the spirit and scope of the present disclosure defined by the description of the claims. Therefore, the description of the present disclosure is intended for illustrative purposes, and has no restrictive meaning to the present disclosure.

EXPLANATIONS OF LETTERS OR NUMERALS

10 BASE STATION APPARATUS
110 TRANSMITTING UNIT
120 RECEIVING UNIT
130 SETTING UNIT
140 CONTROL UNIT
20 USER EQUIPMENT
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a control unit configured to select a further resource, for terminal-to-terminal communication, excluding a resource for transmitting data to another terminal and a resource for receiving a feedback for the data and excluding a time between the resource for transmitting data to another terminal and the resource for receiving a feedback for the data;
a transmission unit configured to transmit the data to the other terminal; and
a reception unit configured to receive the feedback for the data,
wherein the control unit is configured to exclude, from candidate resources for selecting the further resource, a resource of a predetermined time width located after a resource for receiving the feedback and a resource of a predetermined time width located before a resource for retransmitting the data.

2. The terminal as claimed in claim 1, wherein the further resource includes a resource for retransmitting data that has been transmitted to another terminal.

3. A communication method executed by a terminal, the communication method comprising:
selecting a further resource, for terminal-to-terminal communication, excluding a resource for transmitting data to another terminal and a resource for receiving a feedback for the data and excluding a time between the resource for transmitting data to another terminal and the resource for receiving a feedback for the data;
transmitting the data to the other terminal; and
receiving the feedback for the data,
wherein from candidate resources for selecting the further resource, a resource of a predetermined time width located after a resource for receiving the feedback and a resource of a predetermined time width located before a resource for retransmitting the data are excluded.

* * * * *